United States Patent
Hong et al.

(10) Patent No.: US 11,129,327 B2
(45) Date of Patent: Sep. 28, 2021

(54) MOVING ROBOT

(71) Applicant: LG ELECTRONICS INC., Seoul (KR)

(72) Inventors: Woo Hong, Seoul (KR); Siyong Kim, Seoul (KR); Hanshin Kim, Seoul (KR); Hyunsup Song, Seoul (KR); Kyeongho Cho, Seoul (KR); Jaehun Han, Seoul (KR); Jiwoo Ha, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 338 days.

(21) Appl. No.: 16/264,494

(22) Filed: Jan. 31, 2019

(65) Prior Publication Data
US 2019/0307060 A1    Oct. 10, 2019

Related U.S. Application Data

(60) Provisional application No. 62/653,568, filed on Apr. 6, 2018.

(30) Foreign Application Priority Data

Oct. 11, 2018    (KR) .................. 10-2018-0121331

(51) Int. Cl.
| | |
|---|---|
| *A01D 34/00* | (2006.01) |
| *A01D 34/66* | (2006.01) |
| *A01D 34/81* | (2006.01) |
| *B25J 5/00* | (2006.01) |
| *B62D 63/04* | (2006.01) |

(Continued)

(52) U.S. Cl.
CPC .......... *A01D 34/008* (2013.01); *A01D 34/66* (2013.01); *A01D 34/81* (2013.01); *B25J 5/007* (2013.01);

(Continued)

(58) Field of Classification Search
CPC .... A01D 34/008; A01D 34/736; A01D 34/78; A01D 34/81; A01D 34/82; A01D 34/64;

(Continued)

(56) References Cited

U.S. PATENT DOCUMENTS

| | | | |
|---|---|---|---|
| 2,464,912 | A | 3/1949 | White |
| 3,114,229 | A | 12/1963 | Wilson |

(Continued)

FOREIGN PATENT DOCUMENTS

| | | |
|---|---|---|
| AU | 2015418271 | 6/2017 |
| CN | 102523841 | 7/2012 |

(Continued)

OTHER PUBLICATIONS

European Search Report dated Dec. 17, 2019 issued in EP Application No. 19167046.2.

(Continued)

*Primary Examiner* — Abigail A Risic
(74) *Attorney, Agent, or Firm* — KED & Associates LLP

(57) ABSTRACT

A moving robot includes an inner body including a plurality of wheels, an outer cover mounted at the inner body and surrounding an outer side of the inner body, a handle mounted at the outer cover, a plurality of support pillars spaced apart from each other on the inner body and elastically supporting the outer cover in a first horizontal direction and a second horizontal direction with respect to the inner body, a prop tab mounted at each of the plurality of support pillars and configured to fasten the outer cover to the support pillar, and a protrusion tab that extends upwards from an upper surface of the prop tab and penetrates through the outer cover.

20 Claims, 14 Drawing Sheets

(51) Int. Cl.
  *G01D 5/14* (2006.01)
  *G05D 1/02* (2020.01)
  *A01D 101/00* (2006.01)
(52) U.S. Cl.
  CPC ............ *B62D 63/04* (2013.01); *G01D 5/145* (2013.01); *A01D 2101/00* (2013.01); *G05D 1/021* (2013.01); *G05D 2201/0201* (2013.01)
(58) Field of Classification Search
  CPC ...... A01D 34/74; A01D 34/66; A01D 34/007; A01D 2101/00; B25J 11/008; B25J 5/007; G05D 1/0238; G05D 2201/0208; B62D 63/04; G01D 5/145; G01D 5/021
  See application file for complete search history.

(56) References Cited

U.S. PATENT DOCUMENTS

| | | | |
|---|---|---|---|
| 4,194,345 A * | 3/1980 | Pioch | A01D 34/81 56/17.5 |
| 4,835,952 A | 6/1989 | McLane | |
| 5,259,175 A | 11/1993 | Schmidt | |
| 6,470,588 B1 | 10/2002 | Pilger | |
| 6,999,850 B2 * | 2/2006 | McDonald | A47L 9/009 700/245 |
| 7,171,799 B2 | 2/2007 | Takeishi et al. | |
| 8,234,848 B2 * | 8/2012 | Messina | A01D 34/81 56/17.1 |
| 8,336,282 B2 | 12/2012 | Messina et al. | |
| 8,387,193 B2 | 3/2013 | Ziegler et al. | |
| 9,021,777 B2 * | 5/2015 | Johnson | B60L 1/003 56/320.1 |
| 9,027,189 B2 | 5/2015 | Hickenbottom et al. | |
| 9,807,930 B1 | 11/2017 | Lydon et al. | |
| 10,299,432 B1 | 5/2019 | Kelly et al. | |
| 10,375,880 B2 * | 8/2019 | Morin | B25J 5/007 |
| 10,555,457 B2 * | 2/2020 | Song | A01D 34/008 |
| 2005/0021181 A1 | 1/2005 | Kim et al. | |
| 2005/0044836 A1 | 3/2005 | Goto et al. | |
| 2012/0023880 A1 * | 2/2012 | Messina | A01D 34/81 56/10.2 E |
| 2012/0023887 A1 * | 2/2012 | Messina | B60L 50/66 56/320.1 |
| 2013/0061417 A1 * | 3/2013 | Vanderstegen-Drake | A47L 9/1409 15/319 |
| 2013/0291506 A1 | 11/2013 | Johnson et al. | |
| 2014/0216424 A1 | 8/2014 | Gartzke et al. | |
| 2015/0271991 A1 | 10/2015 | Balutis | |
| 2016/0000007 A1 | 1/2016 | Bian et al. | |
| 2016/0014956 A1 | 1/2016 | Matsumoto et al. | |
| 2016/0081526 A1 | 3/2016 | Gottinger et al. | |
| 2016/0128275 A1 | 5/2016 | Johnson | |
| 2016/0278287 A1 | 9/2016 | Kasai et al. | |
| 2016/0338262 A1 | 11/2016 | Liu et al. | |
| 2017/0181375 A1 * | 6/2017 | Hashimoto | A01D 34/81 |
| 2018/0116109 A1 | 5/2018 | Matsumoto | |
| 2018/0184583 A1 * | 7/2018 | Morin | A01D 34/008 |
| 2018/0184585 A1 | 7/2018 | Song et al. | |
| 2018/0199506 A1 | 7/2018 | Ito et al. | |
| 2018/0235146 A1 * | 8/2018 | Hashimoto | A01D 34/78 |
| 2018/0271014 A1 * | 9/2018 | Matsuzawa | A01D 34/008 |
| 2019/0216012 A1 | 7/2019 | Hahn et al. | |
| 2019/0223376 A1 * | 7/2019 | Lee | B25J 13/088 |
| 2019/0258267 A1 | 8/2019 | Hahn et al. | |
| 2019/0278269 A1 * | 9/2019 | He | G05D 1/0022 |
| 2020/0170186 A1 * | 6/2020 | Curtis | F16H 25/20 |

FOREIGN PATENT DOCUMENTS

| | | |
|---|---|---|
| CN | 102934565 | 2/2013 |
| CN | 105746094 | 7/2016 |
| CN | 206808075 | 12/2017 |
| DE | 20 2013 006712 | 10/2013 |
| DE | 20 2012 102 637 | 12/2013 |
| DE | 10 2013 212 605 | 12/2014 |
| DE | 10 2015 221 128 | 5/2016 |
| EP | 2 412 219 | 2/2012 |
| EP | 2 425 700 | 3/2012 |
| EP | 2 656 718 | 10/2013 |
| EP | 2 656 720 | 10/2013 |
| EP | 2 803 255 | 11/2014 |
| EP | 2 997 869 | 3/2016 |
| EP | 03222132 | 9/2017 |
| EP | 2 687 077 | 12/2017 |
| EP | 3 315 000 | 5/2018 |
| EP | 3 513 644 | 7/2019 |
| JP | 2012-105557 | 6/2012 |
| JP | 3180497 | 12/2012 |
| JP | 2013-000028 | 1/2013 |
| JP | 2016-049048 | 4/2016 |
| JP | 2016-123364 | 7/2016 |
| JP | 2016-185099 | 10/2016 |
| JP | 2016-208886 | 12/2016 |
| JP | 2016-208950 | 12/2016 |
| JP | 2017-118842 | 7/2017 |
| JP | 2017-154567 | 9/2017 |
| KR | 10-1997-0039324 | 7/1997 |
| KR | 20-1998-0002204 | 3/1998 |
| KR | 10-2005-0081398 | 8/2005 |
| KR | 10-2011-0110034 | 10/2011 |
| KR | 10-2015-0125508 | 11/2015 |
| KR | 10-2018-0079799 | 7/2018 |
| KR | 10-1915547 | 11/2018 |
| WO | WO 2017/051663 | 3/2017 |
| WO | WO 2017/109877 | 6/2017 |
| WO | WO 2017/109879 | 6/2017 |
| WO | WO 2018/001358 | 1/2018 |
| WO | WO 2018/125222 | 7/2018 |

OTHER PUBLICATIONS

European Search Report dated Aug. 22, 2019 issued in EP Application No. 19152775.3.
European Search Report dated Aug. 22, 2019 issued in EP Application No. 19167018.1.
European Search Report dated Aug. 22, 2019 issued in EP Application No. 19152520.3.
European Search Report dated Aug. 22, 2019 issued in EP Application No. 19166925.8.
European Search Report dated Aug. 26, 2019 issued in EP Application No. 19167302.9.
European Search Report dated Sep. 2, 2019 issued in EP Application No. 19167046.2.
European Search Report dated Sep. 2, 2019 issued in EP Application No. 19167334.2.
European Search Report dated Sep. 2, 2019 issued in EP Application No. 19167328.4.
Australian Office Action dated Sep. 13, 2019 issued in AU Application No. 2019200604.
Korean Notice of Allowance dated Nov. 26, 2020 issued in Application No. 10-2018-0121331.
Korean Notice of Allowance dated Dec. 2, 2020 issued in Application No. 10-2018-0142918.
Korean Notice of Allowance dated Nov. 23, 2020 issued in Application No. 10-2018-0127707.
Korean Office Action dated May 15, 2020 issued in KR Application No. 10-2018-0123916.
Korean Office Action dated May 25, 2020 issued in KR Application No. 10-2018-0127707.
Korean Office Action dated Jun. 12, 2020 issued in KR Application No. 10-2018-0142914.
Korean Office Action dated Jun. 12, 2020 issued in KR Application No. 10-2018-0142916.
Korean Office Action dated Jun. 12, 2020 issued in KR Application No. 10-2018-0142917.
Korean Office Action dated Jun. 12, 2020 issued in KR Application No. 10-2018-0142918.

(56) References Cited

OTHER PUBLICATIONS

Korean Notice of Allowance dated Jan. 5, 2021 issued in KR Application No. 10-2018-0121333.
Korean Notice of Allowance dated Nov. 23, 2020 issued in KR Application No. 10-2018-0123916.
Korean Notice of Allowance dated Dec. 8, 2020 issued in KR Application No. 10-2018-0142916.
Korean Notice of Allowance dated Dec. 8, 2020 issued in KR Application No. 10-2018-0142917.
United States Office Action dated Mar. 11, 2021 issued in U.S. Appl. No. 16/375,400.
United States Office Action dated Mar. 16, 2021 issued in U.S. Appl. No. 16/375,217.
United States Notice of Allowance dated Apr. 1, 2021 issued in U.S. Appl. No. 16/375,294.
United States Office Action dated Apr. 9, 2021 issued in U.S. Appl. No. 16/375,505.
United States Office Action dated Apr. 12, 2021 issued in U.S. Appl. No. 16/373,050.
United States Office Action dated Apr. 12, 2021 issued in U.S. Appl. No. 16/375,424.
U.S. Appl. No. 16/260,865, filed Jan. 29, 2019.
U.S. Appl. No. 16/264,494, filed Jan. 31, 2019.
U.S. Appl. No. 16/373,050, filed Apr. 2, 2019.
U.S. Appl. No. 16/375,424, filed Apr. 4, 2019.
U.S. Appl. No. 16/375,505, filed Apr. 4, 2019.
U.S. Appl. No. 16/375,217, filed Apr. 4, 2019.
U.S. Appl. No. 16/375,294, filed Apr. 4, 2019.
U.S. Appl. No. 16/375,400, filed Apr. 4, 2019.

\* cited by examiner

MOVING ROBOT

CROSS-REFERENCE TO RELATED APPLICATION(S)

This application claims the benefit of earlier filing date and right of priority to U.S. Provisional Application No. 62/653,568 filed Apr. 6, 2018 and priority under 35 U.S.C. § 119 to Korean Application No. 10-2018-0121331 filed on Oct. 11, 2018, whose entire disclosures are hereby incorporated by reference. This application is also related to U.S. patent application Ser. No. 16/260,865 filed on Jan. 29, 2019, U.S. application No. 16/373,050 filed Apr. 2, 2019, U.S. application No. 16/375,424 filed Apr. 4, 2019, U.S. application No. 16/375,505 filed Apr. 4, 2019, U.S. application No. 16/375,217 filed Apr. 4, 2019, U.S. application No. 16/375,294 filed Apr. 4, 2019, and U.S. application No. 16/375,400 filed Apr. 4, 2019, whose entire disclosure isdisclosures are also hereby incorporated by reference.

BACKGROUND

1. Field

The present disclosure relates to a lawn mower robot.

2. Background

A lawn mower may be a machine (or device) used to cut grass that grows in a yard of a house, a playing field, a golf course, and the like. Automated robot-type lawn mower devices have been developed that reduce the labor required to directly operate a lawn mower to cut the lawn and to reduce additional costs incurred for employing a person to cut grass.

The lawn mower robot may be driven by rotating a plurality of wheels with an electric motor mounted on both the front and rear sides of a robot body, and a traveling direction of the robot may be controlled by controlling a revolution per minute (RPM) of the electric motor. The lawn mower robot may have a plurality of blades provided on a lower portion of the robot body and the blades may be rotated using power from a motor to mow the lawn with the plurality of blades.

The applicant of the present disclosure filed a patent application for a lawn mower robot (KR 10-2017-0000416, filed on Jan. 2, 2017), whose entire disclosure is hereby incorporated by reference. The lawn mower robot of the registered patent mentioned above may have a support portion formed of rubber, and the support portion may be mounted on an upper portion of the inner body and elastically support an outer cover movably with respect to the inner body.

According to the configuration, the support portion of the rubber material may absorb a shock, while moving backwards with respect to the inner body when the outer cover collides with an obstacle. A carrying handle may be installed on an upper portion of the outer cover so that a user may grip and lift the lawn mower robot by hand to carry the lawn mower robot.

The outer cover may be positioned at an upper portion of the support portion, and the outer cover and the support portion may be fastened by a fastening member such as a bolt. However, since the support portion is covered by the outer cover, it may be difficult to visually recognize assembling positions of the outer cover and the support portion when the outer cover is assembled to the upper portion of the support portion.

Further, in the case of assembling the carrying handle with an upper portion of the support portion, since the support portion is covered by the outer cover, it may be difficult to fasten the carrying handle with the support portion. The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Figure 1:
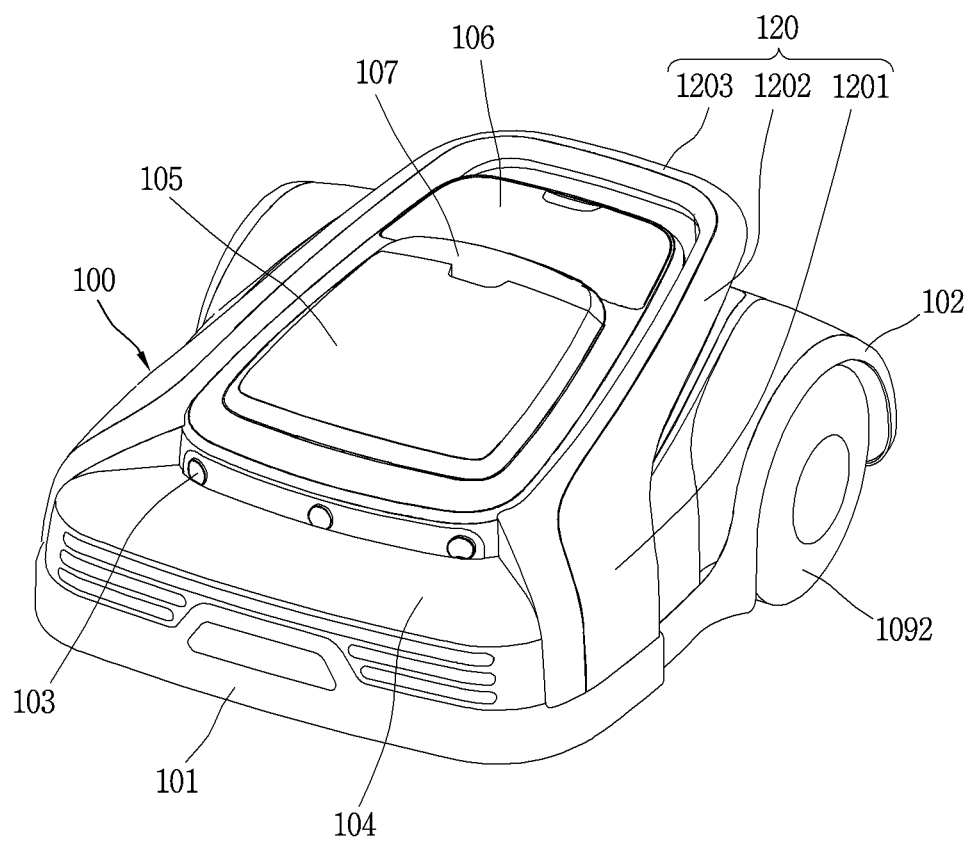
FIG. 1 is a perspective view of a lawn mower robot according to an embodiment in the present disclosure.
Figure 2:
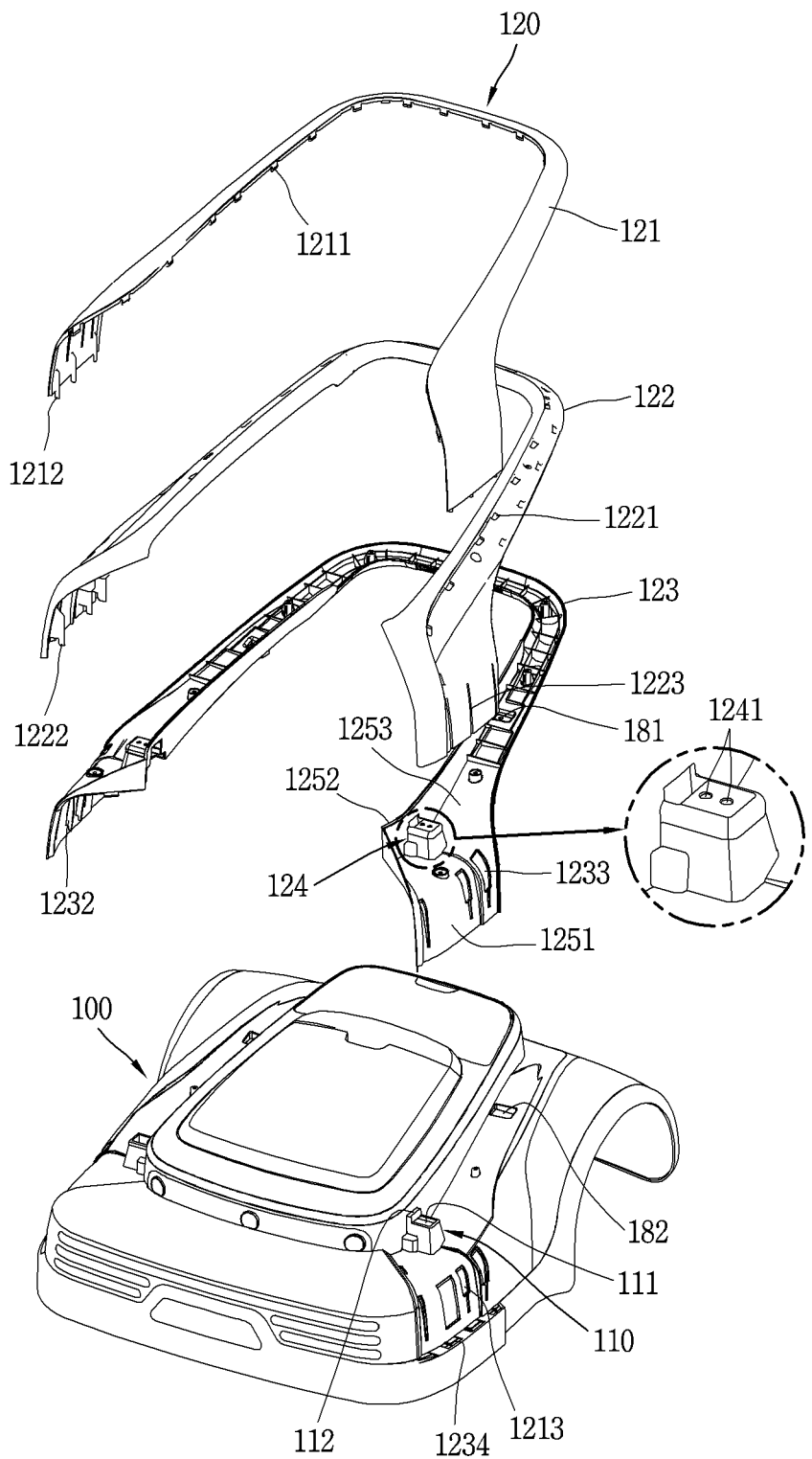
FIG. 2 is an exploded view of a handle and an outer cover in FIG. 1.
Figure 3:
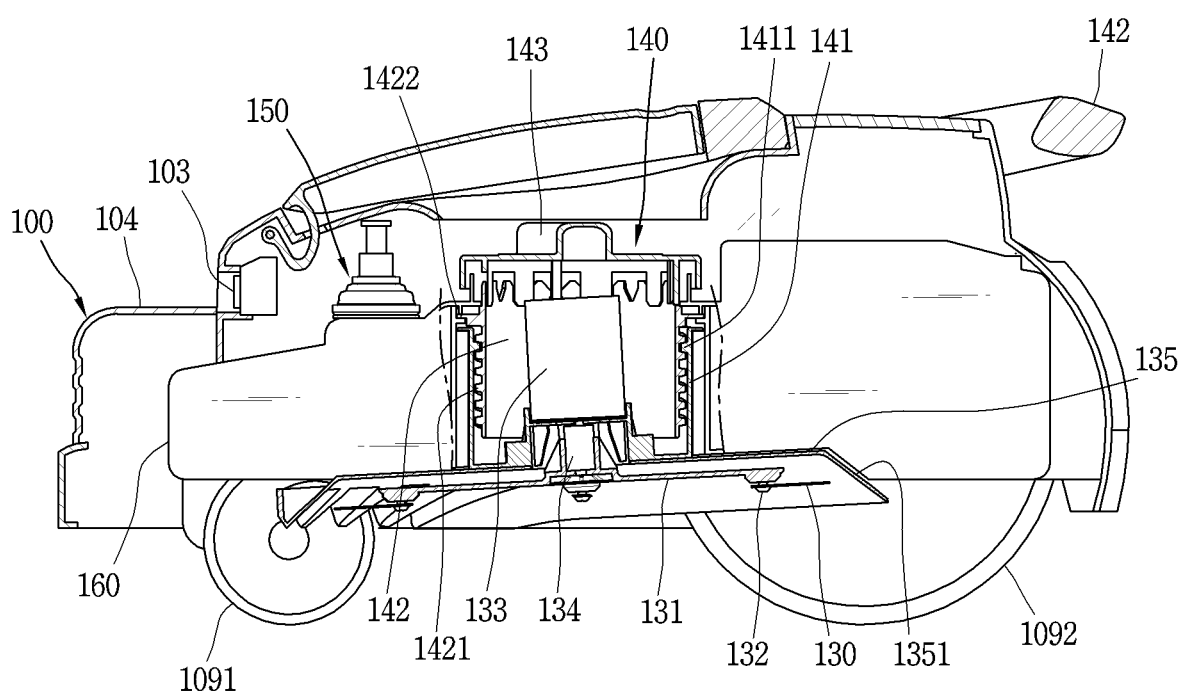
FIG. 3 is a cross-sectional view taken along line III-III in FIG. 1.

As seen in FIGS. 1-3, a lawn mower robot may include an outer cover 100, an inner body 160, and a wheel 1092. The outer cover 100 may form an appearance of the robot. The appearance of the robot may have a shape similar to a car. The outer cover 100 may cover an outer side of the inner body 160.

The outer cover 100 may be mounted on an upper portion of the inner body 160 to cover the upper portion of the inner body 160. A receiving portion may be formed inside the outer cover 100, and the inner body 160 may be accommodated in the receiving portion.

A bumper portion (or bumper) 101 may be formed on a front portion of the outer cover 100 to provide cushion for a collision with an obstacle. The bumper portion 101 may be formed of a rubber material that may mitigate the impact.

A plurality of ultrasonic sensor modules or sensors 103 may be mounted on a front upper portion of the outer cover 100. The plurality of ultrasonic sensor modules 103 may be configured to emit ultrasonic waves toward the front side of the robot, while the robot is traveling, and receive reflected waves reflected from an obstacle to detect the obstacle in front of the robot.

The plurality of ultrasonic sensor modules 103 may be spaced apart from each other in a width direction of the lawn mower robot. The plurality of ultrasonic sensor modules 103 may be spaced apart from the bumper portion 101 by a predetermined distance in a first horizontal direction parallel to a mowing surface.

An ultrasonic waveguide portion or panel 104 may be formed in a plane shape in front of the plurality of ultrasonic sensor modules 103, so that interference may be avoided when an ultrasonic wave is emitted forwards. Further, the ultrasonic waveguide portion 104 may be positioned at a predetermined height from the ground to restrict a lowest value of emitted ultrasonic waves to a predetermined height or higher.

If there is no lowest range of emission of ultrasonic waves, the robot may erroneously detect grass as an obstacle and the robot may be stopped while traveling. According to such a configuration, the ultrasonic wave guiding portion 104 may prevent an ultrasonic wave from being emitted to a height lower than a predetermined height so that the ultrasonic sensor module 103 may sense only an obstacle at a predetermined height or higher.

The robot may include a controller, and the controller may stop an operation of the robot when an obstacle is sensed upon receiving a sensing signal from the ultrasonic sensor module 103. For maintenance and management of the inner body 160 accommodated inside the outer cover 100, a first upper cover 105 and a second upper cover 106 may be hinged to upper portions of the outer cover 100 such that they may be opened and closed.

For example, the first upper cover 105 may be provided on an upper side of a blade height adjusting device of a blade 130, and may be opened for height adjustment of the blade 130. The second upper cover 106 may be provided at an upper portion of a display that is arranged at a rear upper portion of the inner body 160, and may be opened for an operation of the display, and the like.

The second upper cover 106 may be provided behind the first upper cover 105. A stop switch 107 may be installed between the first upper cover 105 and the second upper cover 106. The stop switch 107 may be mounted in a pressing manner on the outer cover 100. When the user presses the stop switch 107 once in case of emergency, the robot switch may be turned on and the operation of the robot may be stopped, and when the stop switch 107 is pressed again, the operation of the robot may be resumed.

Front ends of the first upper cover 105 and the second upper cover 106 may be hinged to the outer cover 100 so that the respective rear ends thereof may be rotated upwards to be opened. The stop switch 107 may protrude relative to the first and second upper covers 106. The operation of the robot may be stopped when an upper end portion of the outer cover 100 is caught by a branch so the stop switch 107 is pressed while the robot is traveling.

Figure 6:
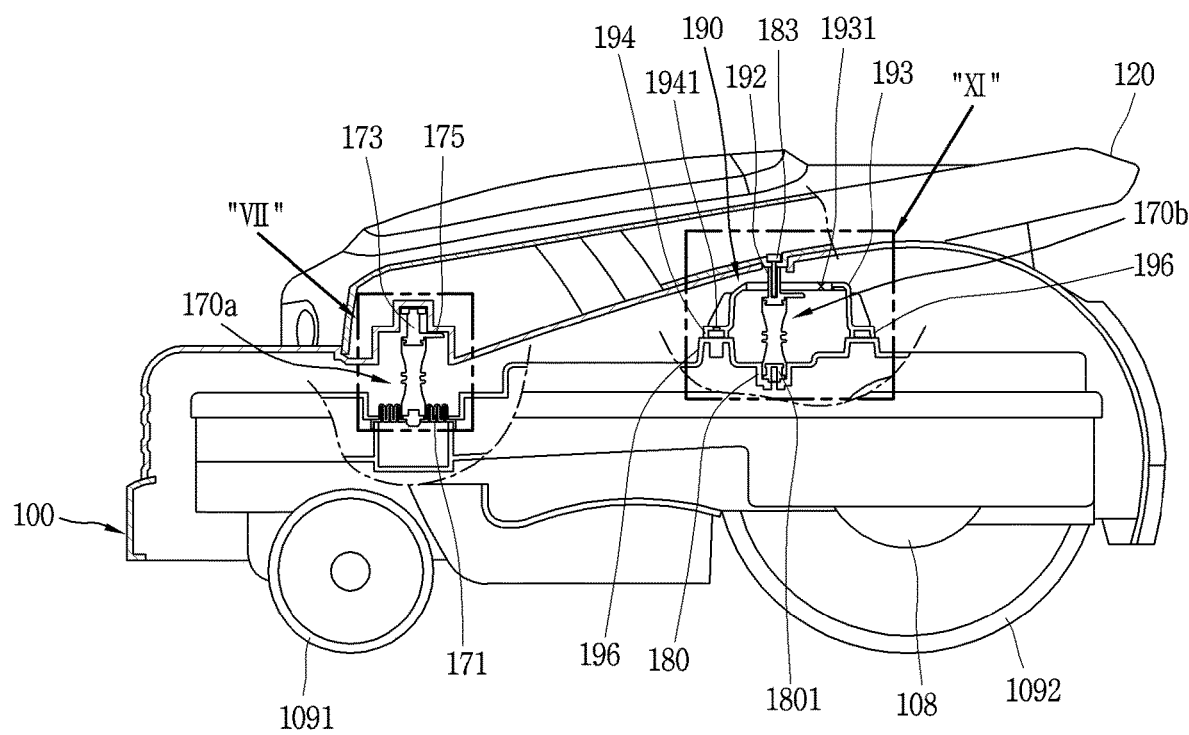
FIG. 6 is a cross-sectional view taken along VI-VI of FIG. 4.
Figure 7:
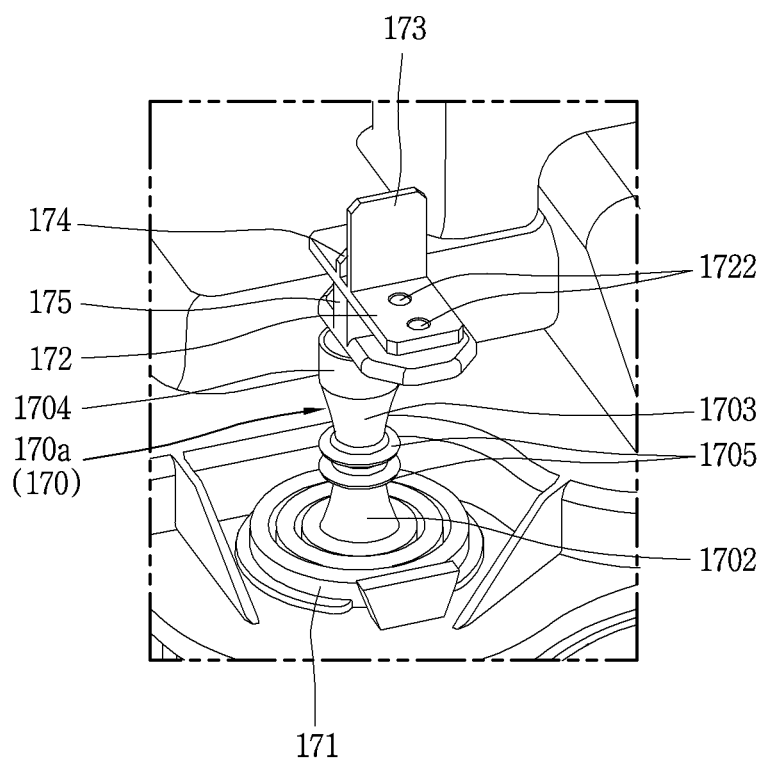
FIG. 7 is an enlarged view of a portion 'VII' in FIG. 6, illustrating a front support.
Figure 8:
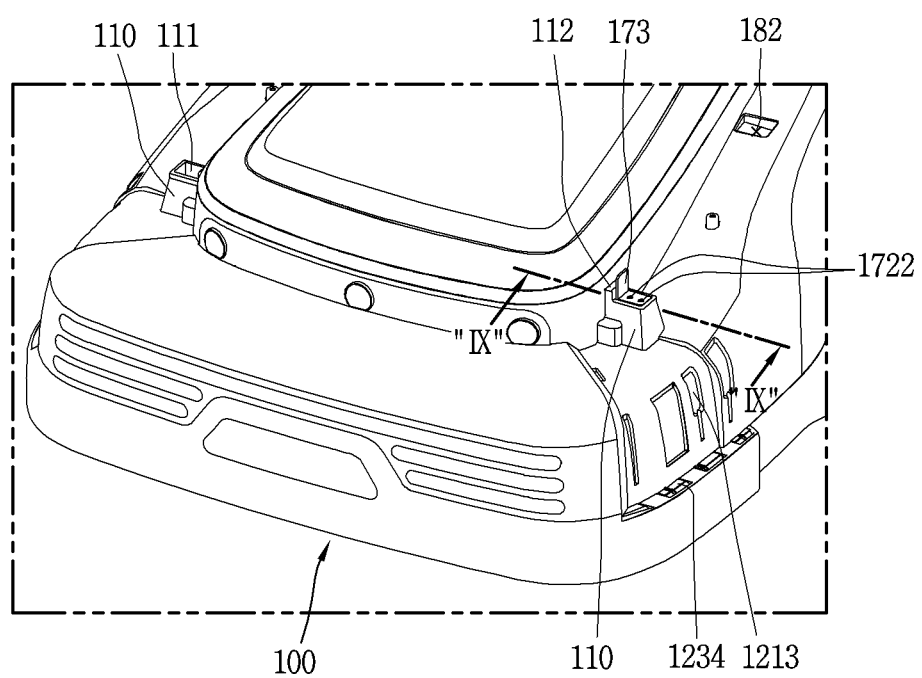
FIG. 8 is a conceptual view illustrating a state in which a front support and an outer cover of FIG. 7 are assembled.
Figure 9:
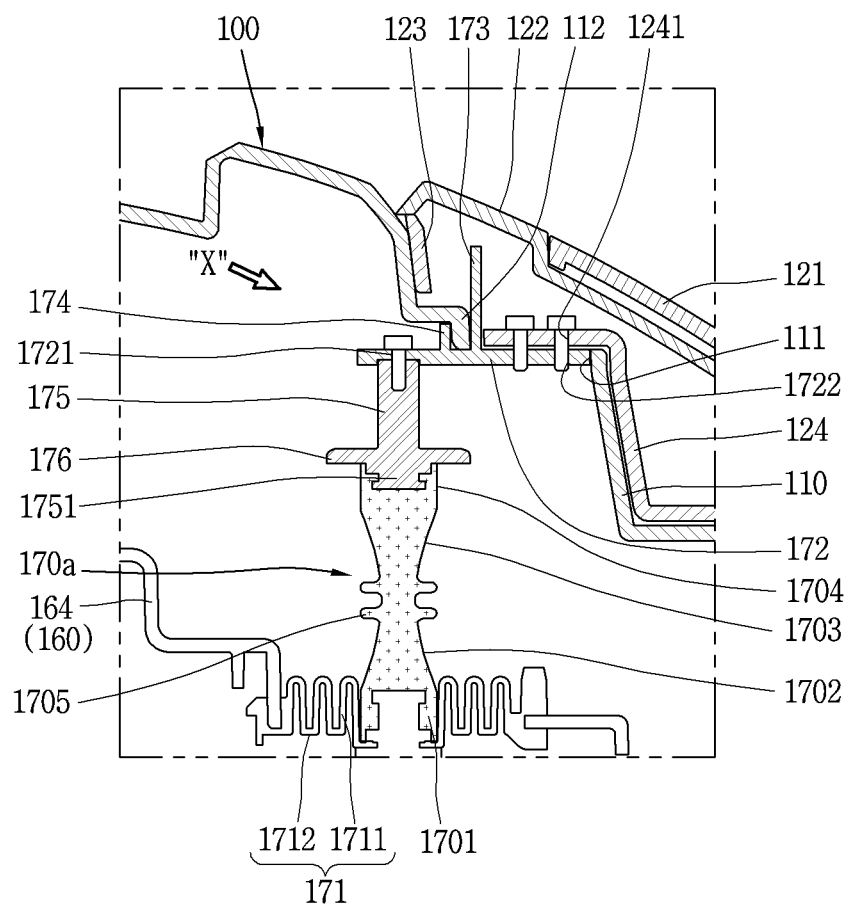
FIG. 9 is a cross-sectional view taken along IX-IX in FIG. 8.
Figure 10:
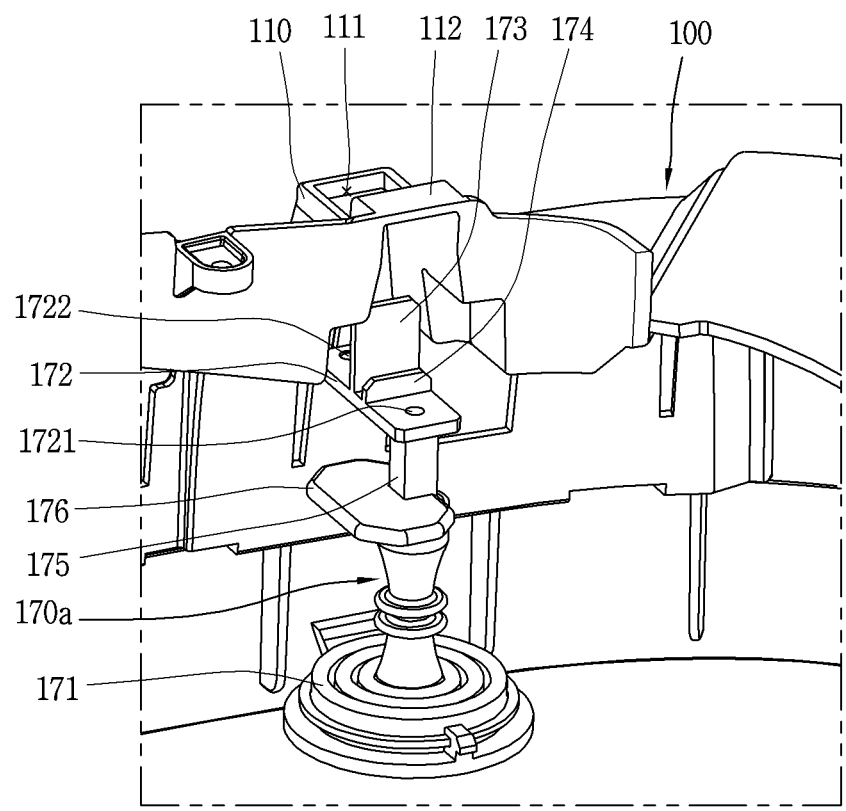
FIG. 10 is an enlarged view illustrating a state in of a front support viewed in an X direction before being assembled to an outer cover in FIG. 9.
Figure 11:
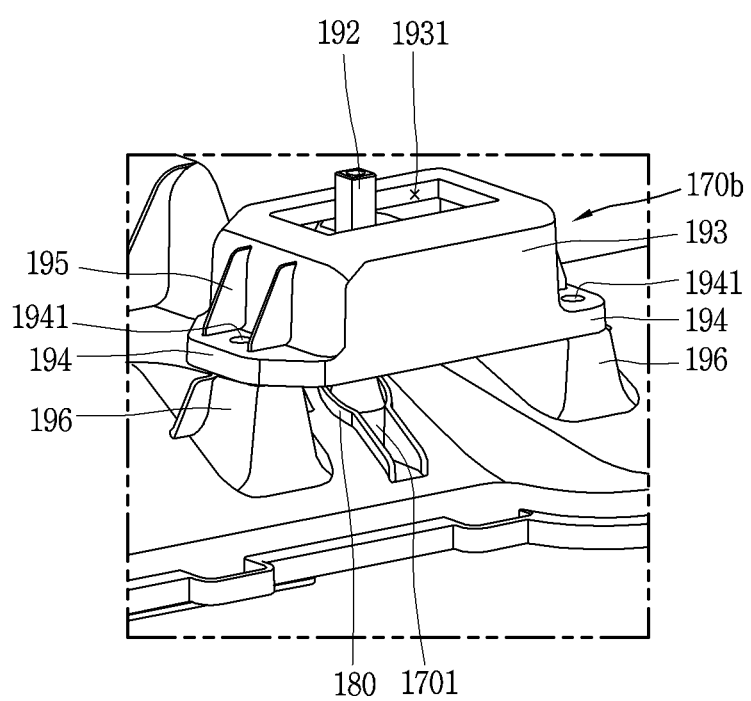
FIG. 11 is an enlarged view of a portion 'XI' in FIG. 6, illustrating a state in which an engaging portion of a rear support is accommodated inside a movement restricting cover.
Figure 12:
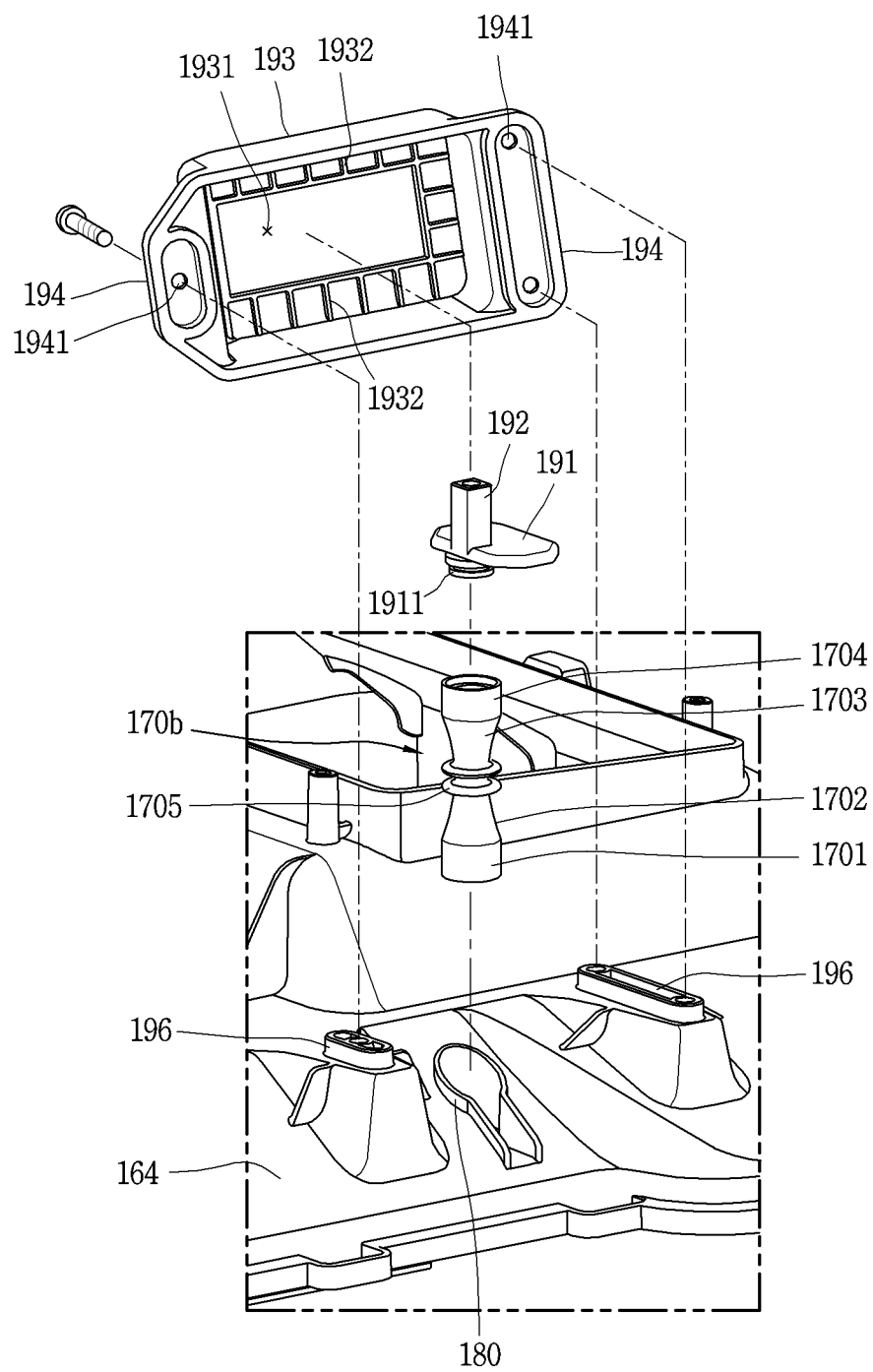
FIG. 12 is an exploded view of FIG. 11.
Figure 13:
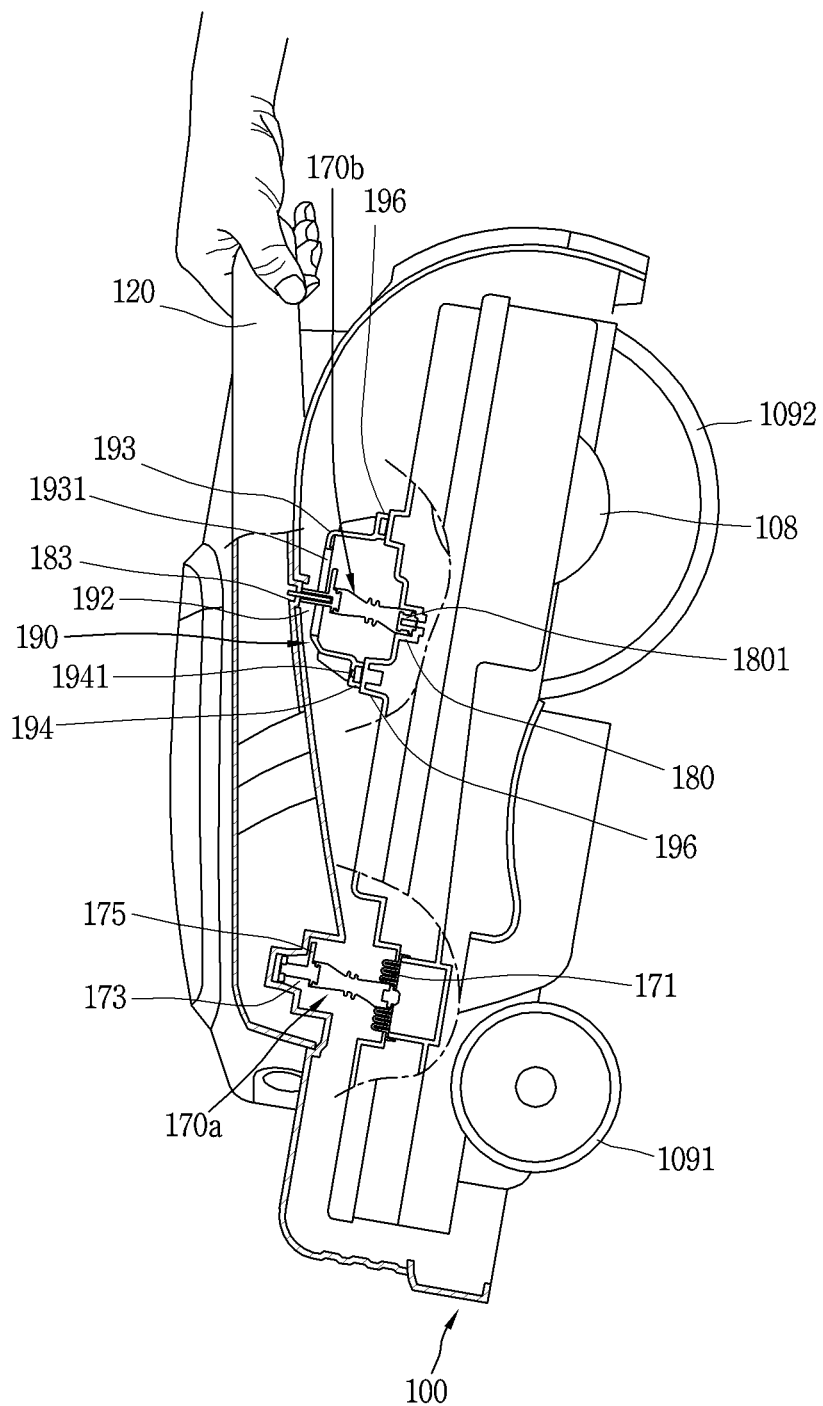
FIG. 13 is a conceptual view illustrating a state in which a user grips and lifts a handle when a lawn mower robot is transported in FIG. 6.
Figure 14:
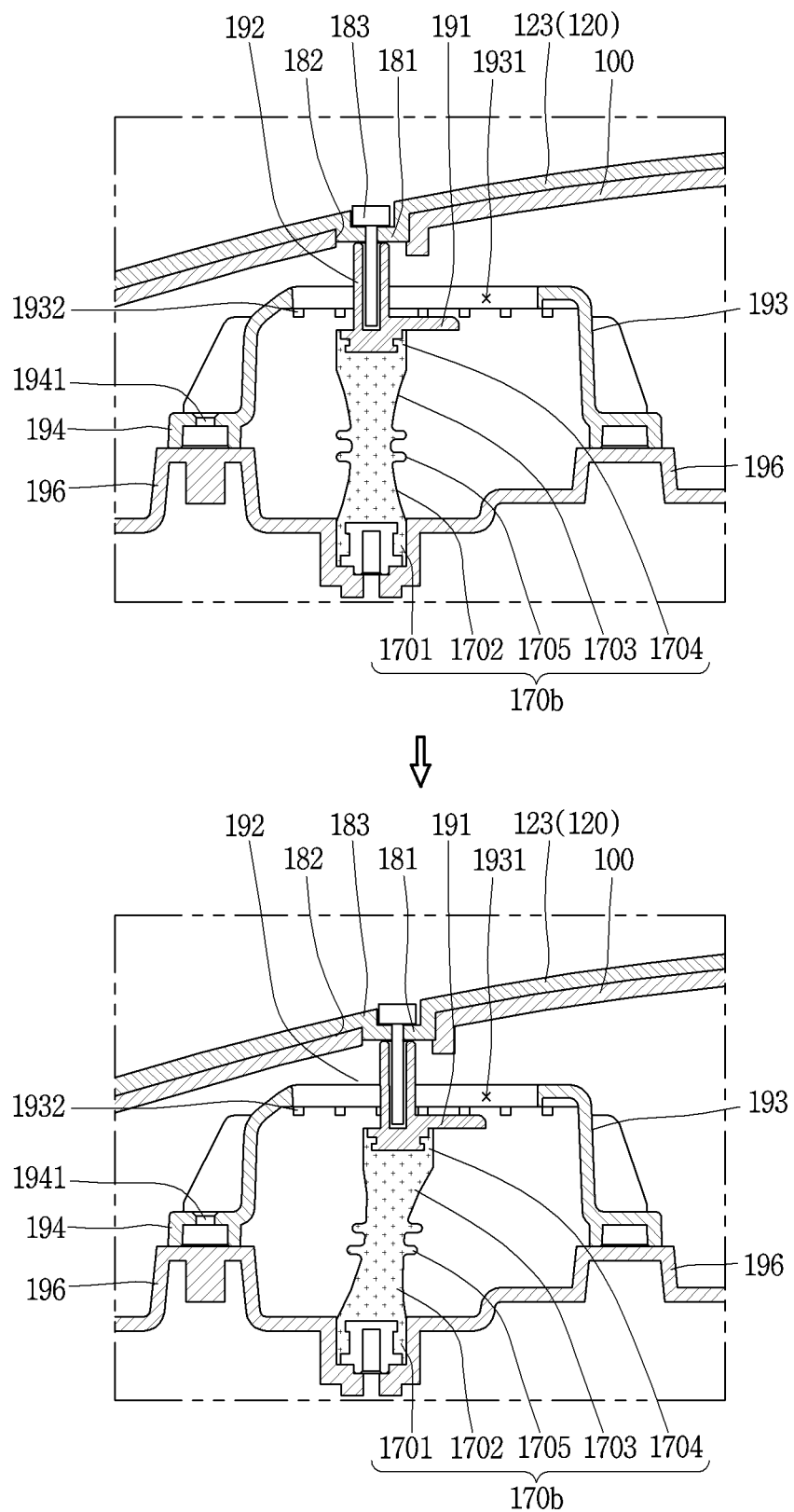
FIG. 14 is an enlarged view of a portion 'XIV' in FIG. 13, illustrating states before and after a force is applied to a handle to transport the lawn mower robot.

A driving unit may be installed on both sides of a lower portion of the inner body 160. The driving unit may include a driving motor 108 (See FIG. 6) and a decelerator. The driving motor 108 may extend in a width direction of the inner body 160.

Each of a plurality of wheels 1092 may be connected to the driving motor 108 and rotatably installed on both sides of the inner body 160 in the width direction. Each of the plurality of wheels 1092 may be connected to the driving motor 108 by a driving shaft and may be rotated upon receiving power from the driving motor 108.

A plurality of casters 1091 may be mounted on a lower surface of the inner body 160. Each of the plurality of casters 1091 may be coupled to the inner body 160 by a shaft. Each of the plurality of casters 1091 may be rotatably mounted at 360 degrees about the shaft.

The plurality of casters 1091 may be arranged on a front side of the inner body 160 and spaced apart from each other in the width direction. The plurality of wheels 1092 may provide power to drive the robot, and an RPM of each of the plurality of wheels 1092 may be independently controlled by the controller.

According to such a configuration, steering may be selectively performed in a left-right direction according to RPM of each of the plurality of wheels 1092. For example, if the number of RPM of the right wheel 1092 is larger than that of the left wheel 1092, steering may be performed to the left.

A fender portion (or fender) 102 may be provided on both sides of the rear of the outer cover 100 to cover the plurality of wheels 1092. The fender portion 102 may be radially spaced apart from the wheel 1092.

A handle 120 (which may also be referred to as a 'carrying handle') may be installed on the outer cover 100 so that the user may grip it by hand when carrying the lawn mower robot. The handle 120 may include a front coupling portion (or front connector) 1201, a sloped portion (or extension) 1202, and a handle portion (or grip) 1203.

The front coupling portion 1201 may be coupled to both sides of the front of the outer cover 100 in a length direction of the outer cover 100. The sloped portion 1202 may be sloped upwards toward the rear of the outer cover 100 from the front coupling portion. The handle portion 1203 may be connected to the rear end of the sloped portion 1202 on both sides thereof and may extend in a transverse direction so that the user may grip the handle 1203 by hand.

The front coupling portion 1201 of the handle 120 may be attached to both sides of the front of the outer cover 100 and the handle portion 1203 of the handle 120 may be spaced apart from an upper portion of a rear end of the outer cover 100 so as to be wrapped and gripped by hand. The handle 120 may be formed in a shape similar to a "U" shape, having a structure in which a front end portion thereof is opened toward the front and the rear end is closed.

When the rear end portion of the handle 120 is gripped and lifted, a front end portion of the outer cover 100 may extend in a gravity direction (downward direction) and a rear end portion of the outer cover 100 may face in an opposite direction (upward direction) due to self-load. The handle 120 may be classified into an upper part 121, a middle part 122, and a lower part 123 from above according to stacking order.

The lower part 123 may be contactable with the outer cover 100, the middle part 122 may be stacked on top of the lower part 123, and the upper part 121 may be provided on top of the middle part 122. Front ends of the lower part 123 and the middle part 122 may extend downwards and may be fastened to both sides of the front of the outer cover 100. The upper part 121 may cover the middle part 122 so that a bolt 132, or the like, is not exposed to the outside for the sake of aesthetical appearance and the upper part 121 and the middle part 122 may be fastened to each other in a hook coupling manner.

A plurality of coupling hooks 1211 may be formed on an inner surface of the upper part 121 along the length of the upper part 121 and a plurality of hook coupling holes 1221 may be formed along the length of the middle part 122 to face the coupling hooks 1211 in an up-down direction, and the coupling hooks 1211 may be insertedly coupled to the hook coupling holes 1221 to couple the upper part 121 and the middle part 122. A plurality of fastening protrusions may protrude downwards from a lower surface of the middle part 122, a plurality of bosses may be formed on an upper surface of the lower part 123 to be coupled with the fastening protrusions, and a protrusion receiving recess may be formed in each of the plurality of bosses.

The plurality of fastening protrusions may be inserted into the plurality of protrusion receiving recesses, respectively, so that the middle part 122 and the lower part 123 may be assembled with each other. A plurality of arrest hooks 1212, 1222 and 1232 may be formed on inner surfaces of the front end portions of the upper part 121, the middle part 122, and the lower part 123, respectively. The plurality of arrest hooks 1212, 1222 and 1232 may be spaced apart from each other in the length direction of the upper part 121, the middle part 122 and the lower part 123. Here, the arrest hooks 1212, 1222, and 1232 of the upper part 121, the middle part 122, and the lower part 123 may be provided in a non-overlapping manner or may be staggered in the length direction to avoid mutual interference when the upper part 121, the middle part 122, and the lower part 123 are assembled.

A plurality of arrest holes 1223, 1233 and 1213 may be formed on both sides of the front end portions of the middle part 122, the lower part 123, and the outer cover 100 so that the arrest hooks 1212, 1222, 1232 may be inserted and caught in the arrest holes 1223, 1233, and 1213, respectively. Each of the plurality of arrest holes 1223, 1233, and 1213 may have a width narrowed from an upper end portion thereof toward a lower end portion thereof.

According to such a configuration, the arrest hooks 1212, 1222, and 1232 may easily enter the upper end portions of the arrest holes 1223, 1233, and 1213, and since the arrest hooks 1212, 1222, and 1232 are tightened toward the lower end portions of the arrest holes 1223, 1233, and 1213, the upper part 121, the middle part 122, and the lower part 123 may be firmly coupled. A plurality of fixing recesses 1234 for fixing the arrest hooks 1232 may be formed at lower portions of both sides of the front end portions of the outer cover 100 and the plurality of arrest hooks 1232 may be inserted into and coupled to the fixing recesses 1234.

A rear end portion of the handle 120 may be similar in height to the stop switch 107. The stop switch 107 may be provided on a front side of the outer cover 100, relative to the rear end portion of the handle 120, and thus, the rear end portion of the handle 120 may be prevented from being caught by the branches, or the like. When the robot passes by branches located at the height of the stop switch 107 in front of the robot, the stop switch 107 may be pressed by the branches to stop the robot, and thus, since the rear end portion (portion gripped by the user's hand) of the handle 120 may not be caught by the branches, transmission of an impact to the inner body 160 through the handle 120 and the outer cover 100 may be prevented.

A plurality of blades 130 may be rotatably installed on a lower surface of the inner body 160 to cut grass. The plurality of blades 130 may be mounted on a rotary plate 131 and rotatably configured so as to be outwardly deployed in a radial direction of the rotary plate 131 or folded inwardly of the rotary plate 131 in the radial direction. The plurality of blades 130 may be spaced apart from each other in the circumferential direction of the rotary plate 131.

Each of the plurality of blades 130 may be configured such that a first end portion thereof is coupled to the edge of the rotary plate 131 by a fastening member and a second end portion thereof rotates about a bolt 132. The rotary plate 131 may be rotatably mounted on a lower surface of the inner body 160. The rotary plate 131 may be provided with power by a blade driving motor 133. The blade driving motor 133 may be installed inside the inner body 160.

A motor shaft 134 of the blade driving motor 133 may protrude downwards. The motor shaft 134 of the blade driving motor 133 may be fastened to a central portion of the rotary plate 131, and the rotary plate 131 may rotate about the motor shaft 134.

The rotary plate 131 may be arranged obliquely such that a front portion thereof is lower than a rear portion with respect to a horizontal plane. The motor shaft 134 may be sloped forwards with respect to a vertical plane according to a slope angle (e.g., 3 degrees) of the rotary plate 131. According to this configuration, the blade 130 arranged toward the front of the inner body 160, among the plurality of blades 130, may be lower than the blade 130 arranged toward the rear of the inner body 160. Accordingly, the blade 130 positioned near the front may remove lower portions of the grass, compared with the blade 130 positioned near the rear, thus preventing an increase in the load amount of the lawn mowing of the blade 130 positioned on the rear.

In order to prevent debris generated during collision between the blade 130 and a foreign object such as stone from being thrown out of the outer cover 100 when the blade 130 is cutting the grass, a blade protecting cover 135 may be mounted on a lower surface of the inner body 160. The blade protecting cover 135 may be mounted such that it may be lifted together with the rotary plate 131 by a lifting frame 141 in an up-down direction. For example, the lifting frame 141 may be installed so as to be lifted in an up-down direction, without being rotated, inside the inner body 160.

The blade protecting cover 135 may include a sloped portion (or slope) 1351 to prevent debris generated due to collision between the blade 130 and stone from being thrown to the outside. To this end, the sloped portion 1351 may extend obliquely downwards from an upper surface of the blade protecting cover 135 and a lower end portion of the sloped portion 1351 may be lower than a plane perpendicular to the rotary shaft (bolt) 132 of the blade 130. According to such a configuration, debris of stone may be bumped into the sloped portion 1351 of the blade protecting cover 135 and may fall to the ground on an inner side of the blade protecting cover 135.

The rotary plate 131 may be mounted on a lower surface of the lifting frame 141 and a height of the blade 130, in a state of being mounted on the rotary plate 13, may be adjusted by a predetermined amount according to a height of the grass to be cut. To this end, a height adjusting unit 140 may be provided inside the inner body 160.

The height adjusting unit 140 may include the lifting frame 141, a rotary cylindrical portion (or rotary cylinder) 142, and a height adjustment lever 143. The height adjustment lever 143 may be provided at an upper portion of the rotary cylindrical portion 142 so that the user may hold and rotate it. The rotary cylindrical portion 142 may be accommodated in the lifting frame 141 and may be coupled to a lower portion of the height adjustment lever 143 and rotated in conjunction with rotation of the height adjustment lever 143.

A male screw portion (or male screw) 1421 may protrude from an outer circumferential surface of the rotary cylindrical portion 142 in a spiral direction. A spiral protrusion 1411 may be formed on an inner circumferential surface of the lifting frame 141 and the male screw portion 1421 of the rotary cylindrical portion 142 may be engaged with the spiral protrusion 1411.

A descent restricting protrusion 1422 may be formed on an outer circumferential surface of an upper end portion of the rotary cylindrical portion 142 to restrict descending of the rotary cylindrical portion 142 and to support the rotary cylindrical portion 142 to be rotatable in place. The lifting frame 141 may include a rotation restricting projection on an outer circumferential surface thereof and may be mounted to be lifted or lowered, without being rotated, inside the inner body 160.

According to such a configuration, when the height adjustment lever 143 rotates in a clockwise direction, the rotary cylindrical portion 142 coupled to the height adjustment lever 143 may rotate and the lifting frame 141 may descend, according to which the blade protecting cover 135 and the blade 130 may be adjusted together to a predetermined height. In a state in which the blade protecting cover 135 is fixed after having been adjusted in height, the plurality of blades 130 may rotate with respect to the blade protecting cover 135 to cut grass. The blade driving motor 133 may be mounted inside the rotary cylindrical portion 142 and may be supported by the rotary cylindrical portion 142.

Figure 4:
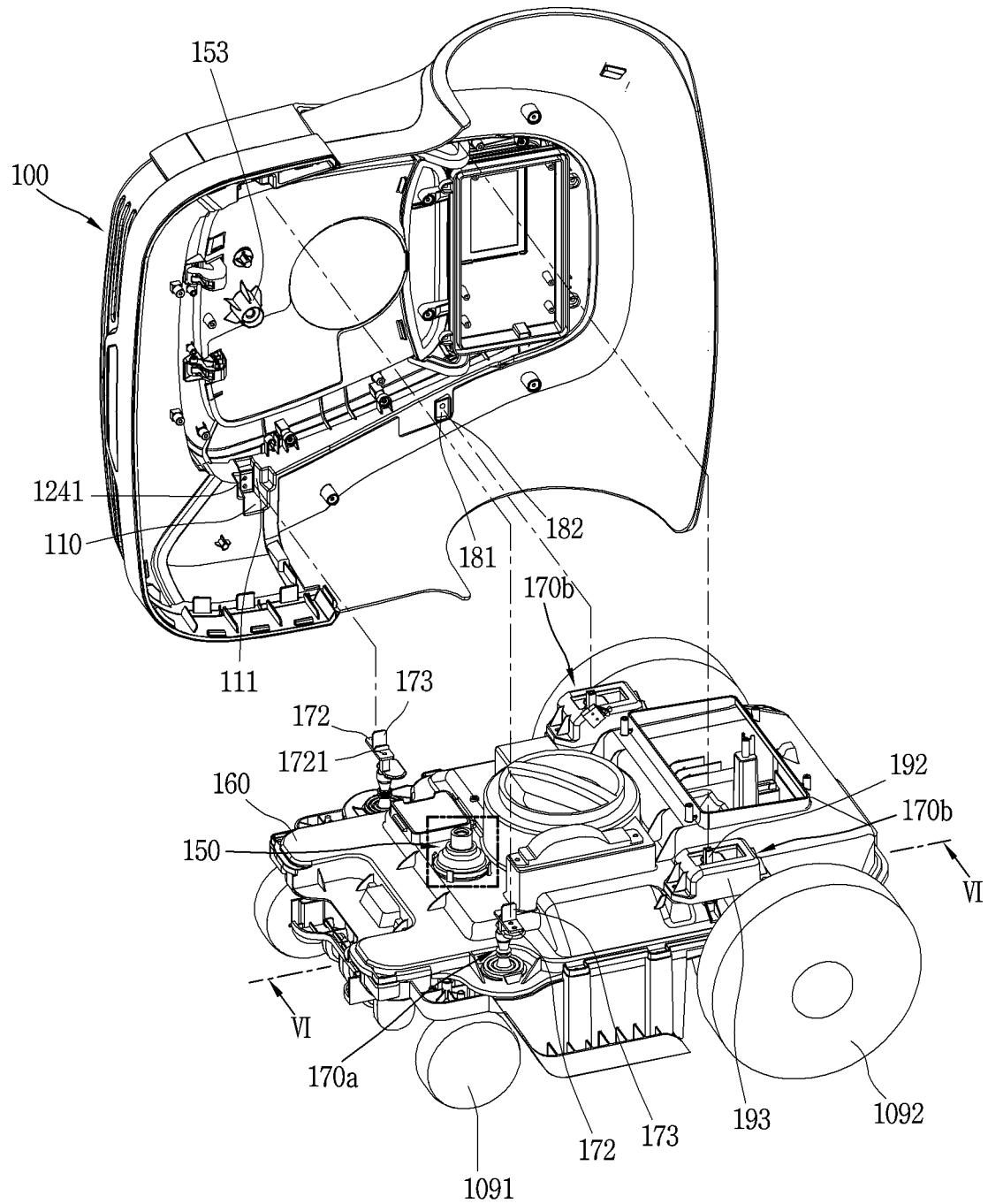
FIG. 4 is an exploded perspective view illustrating a state in which an outer cover in FIG. 1 is disassembled from an inner body.
Figure 5:
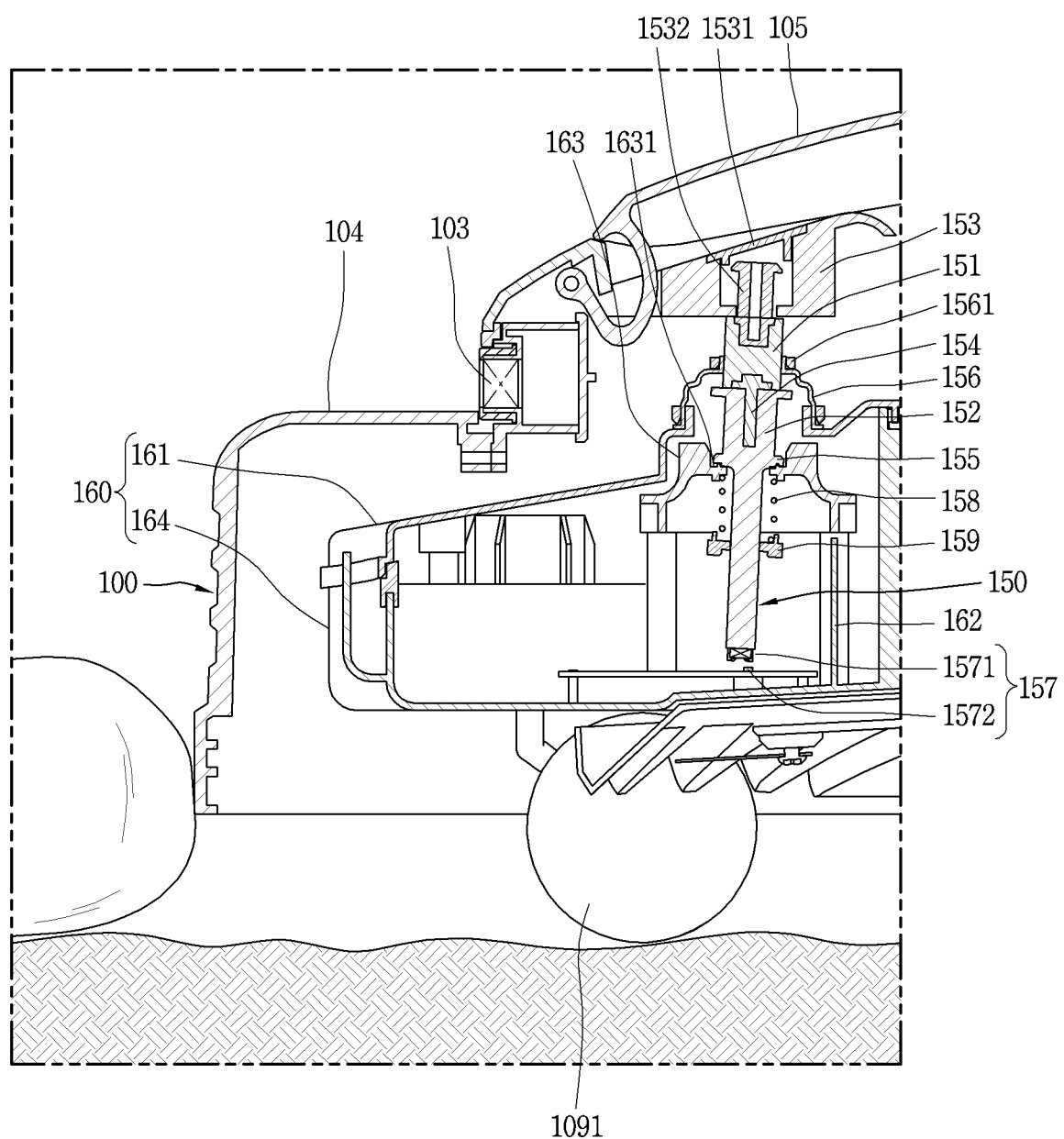
FIG. 5 is a cross-sectional view illustrating an operational state of a joystick bumper in a portion 'V' of FIG. 4.

Referring to FIGS. 4 and 5, the outer cover 100 may be mounted to be movable in a front-rear direction and in a left-right direction with respect to the inner body 160. To this end, a plurality of support portions (or support pillars or dampers) 170 may be mounted on an upper portion of the inner body 160. The plurality of support portions 170 may be spaced apart from each other at four positions on both right and left sides of the front and on both right and left sides of the rear in the length direction of the inner body 160 to support the outer cover 100 to be movable with respect to the inner body 160.

Each of the plurality of support portions 170 may be formed of an elastic material such as rubber, or the like, and may elastically support the outer cover 100 so that an external impact may be absorbed through the outer cover 100 and transmission of the external impact to the inner body 160 may be minimized.

A joystick bumper 150 may be mounted on the inner body 160 to detect a collision between an obstacle and the outer cover 100. The joystick bumper 150 may detect a collision between the outer cover 100 and an obstacle (e.g., a large stone, etc.), and when an impact from the obstacle is absorbed, the joystick bumper 150 may return the outer cover 100 to its original position.

The joystick bumper 150 may include an upper bumper 151 and a lower bumper 152. Each of the upper bumper 151 and the lower bumper 152 may extend in an up-down direction. The upper bumper 151 may be provided at an upper portion so as to be connected with the outer cover 100.

A joystick bumper fastening portion or bracket 153 may protrude downwards from an inner surface of the outer cover 100. A fastening hole may be formed inside the joystick bumper fastening portion 153 in a penetrating manner in an up-down direction in order to insertedly fasten a fastening member (or fastener) 1532. A hole cover 1531 may be fitted to an upper portion of the fastening hole so as to cover the fastening hole.

A fastening recess may be formed at an upper end of the upper bumper 151. As the fastening member 1532 such as a bolt is fastened to the fastening recess of the upper bumper 151 through the fastening hole of the joystick bumper fastening portion 153, the outer cover 100 and the upper bumper 151 may be fastened.

The upper bumper 151 and the lower bumper 152 may be coupled to each other by a coupling member (or fastener) 154. To this end, the upper bumper 151 and the lower bumper 152 may respectively have coupling recesses extending in an up-down direction to correspond to each other. The upper and lower portions of the coupling member 154 may be fitted into the coupling recesses of the upper bumper 151 and the lower bumper 152 to fasten the upper bumper 151 and the lower bumper 152.

The lower bumper 152 may be rotatably or moveably mounted to the inner body 160 in the front-rear direction. To this end, the lower bumper 152 may have a joint protrusion 155 on an outer circumferential surface thereof, and the joint protrusion 155 may protrude radially along a circumferential direction from the middle of the lower bumper 152 in the length direction.

The lower bumper 152 may be mounted on the inner body 160 such that the upper and lower end portions thereof are rotatable or moveable in the front-rear direction or in the left-right direction based on the joint protrusion 155. The inner body 160 may include a main body of the inner body 161 and an inner body cover 164 which are provided at a lower portion and an upper portion thereof, respectively. A bumper frame 162 extending upwards from the inside of the main body of the inner body 161 may be formed.

A bumper mounting portion 163 may be provided at an upper end of the bumper frame 162 to cover an upper portion of the bumper frame 162. The bumper mounting portion 163 may include a protrusion receiving recess 1631 at an upper portion thereof and the protrusion receiving recess 1631 may surround the joint protrusion 155 to support the joint protrusion 155 to be rotatable or moveable in the front-rear direction or left-right direction. The lower bumper 152, in a state of being accommodated inside the bumper frame 162, may be rotatably supported by the protrusion receiving recess 1631 of the bumper mounting portion 163.

A restoring spring 158 may be provided between the lower bumper 152 and the bumper mounting portion 163. An upper end portion of the restoring spring 158 may be fastened to the inside of a coupling portion of the bumper mounting portion 163 and a lower end portion of the restoring spring 158 may be fastened to a spring seat portion (or spring seat) 159 of the lower bumper 152.

The coupling portion may protrude downwards from the inside of an upper portion of the bumper mounting portion 163 and may extend in a circumferential direction. The spring seat portion 159 may extend in the circumferential direction from an outer circumferential surface of the lower bumper 152 and may protrude in a radial direction.

According to such a configuration, when the outer cover 100 collides with an obstacle and an impact thereof is released, the restoring spring 158 restores the joystick bumper 150 to its original position by an elastic force, so that the outer cover 100 may be moved to its original position. The joystick bumper 150 may include an elastic member 156 to elastically support the joystick bumper 150 so as to be rotatable or moveable in the front-rear direction or the left-right direction with respect to the inner body 160.

The elastic member 156 may be formed in a conical shape. The elastic member 156 may be in the form of a bellows. The elastic member 156 may enclose a portion of each of the upper bumper 151 and the lower bumper 152.

An upper end portion of the elastic member 156 may be fixed to the upper bumper 151 by a fixing strip 1561 and a lower end portion of the elastic member 156 may be fixed to one side of the inner body cover 164 by the fixing strip 1561. A collision sensor unit (or collision sensor) 157 may be provided at the inner body 160 to detect a collision of the outer cover 100 with an obstacle.

The collision sensor unit 157 may include a permanent magnet 1571 and a hall sensor 1572. The permanent magnet 1571 may be installed at a lower end of the lower bumper 152. The hall sensor 1572 may be installed on a lower surface of the main body of the inner body 161 and face the permanent magnet 1571 in an up-down direction. For example, an operational state when the outer cover 100 collides with an obstacle at the front will be described as follows.

When the outer cover 100 moves back with respect to the inner body 160 due to a collision with an obstacle, the upper bumper 151 may be pushed back together with the outer cover 100 and the lower bumper 152 may rotate or move forwards centered on the joint protrusion 155. Here, the permanent magnet 1571 provided at the lower end of the lower bumper 152 may be separated forwards from the hall sensor 1572 provided on the lower surface of the main body of the inner body 161, and thus, the hall sensor 1572 may sense that the outer cover 100 has collided with the obstacle.

When the controller senses the collision between the outer cover 100 and the obstacle upon receiving a sensing signal from the hall sensor 1572, the controller may move the robot back to change a traveling route of the robot. When the impact transmitted from the obstacle to the outer cover 100 is released as the robot is moved backward, the restoring spring 158 may restore the joystick bumper 150 to its original position by an elastic force thereof, and accordingly, the outer cover 100 may be moved to the original position thereof.

Referring to FIGS. 6-10, each of the plurality of support portions 170 may have a bar shape. Each of the plurality of support portions 170 may be elongated in an up-down direction. The plurality of support portions 170 may be configured as four support portions.

Among the four support portions 170, the support portions 170 provided on the left and right sides of the front portion of the inner body 160 may be referred to as front support portions 170*a*. Among the four support portions 170, the support portions 170 disposed on the left and right sides of the rear portion of the inner body 160 may be referred to as rear support portions 170*b*. The front support portions 170*a* may be arranged lower than the rear support portions 170*b*.

Each of the plurality of support portions 170 may include a lower support portion (or lower support pillar base) 1701, a lower neck portion (or lower neck) 1702, an upper neck portion (or upper neck) 1703, and an upper support portion (or upper support pillar base) 1704 according to shapes and structures. The lower support portion 1701 may be provided at a lower portion in a length direction of the support portion 170 and may have a cylindrical shape. The lower support portion 1701 may be elastically supported by or fixed to the inner body cover 164.

The lower support portion 1701 of the front support portion 170*a* may be elastically supported and the lower support portion 1701 of the rear support portion 170*b* may be fixedly supported. In order to elastically support the lower support portion 1701, a corrugated portion or skirt 171 may be further provided to surround an outer circumferential surface of the lower support portion 1701.

A support frame may protrude from a lower surface of the main body of the inner body 161 to support a lower end portion of the lower support portion 1701 to prevent the lower end portion of the lower support portion 1701 from sagging downwards. However, the support frame may allow movement of the lower support portion 1701 in a front-rear direction or in a left-right direction.

The corrugated portion 171 may extend in a radial direction from an outer circumferential surface of the support portion 170 so as to be corrugated. The corrugated portion 171 may include a plurality of bent portions (or bends) 1711 and a plurality of connecting portions (or bases) 1712.

The plurality of bent portions 1711 may each have a reversed ∪ shape, i.e., "∩" shape, in cross-section and formed in a circumferential direction and may be spaced apart from each other in a radial direction. The plurality of bent portions 1711 may overlap each other in the radial direction.

The plurality of connecting portions 1712 may connect lower ends of the plurality of radially adjacent bending portions 1711. An inner end portion of the corrugated portion 171 may be fastened to a lower end of the lower support portion 1701 by fastening members 183 and 1532 such as screws, or the like. An outer end portion of the corrugated portion 171 may be fastened to the inner body cover 164 by fastening members 183 and 1532.

The corrugated portion 171 may elastically support the front support portion 170*a* so as to be movable in four directions, that is, in the front-rear direction and the left-right direction, further enhancing impact absorbing performance when the outer cover 100 collides with an obstacle. The lower neck portion 1702 may be formed so that a cross-sectional area (or diameter) thereof is reduced from an upper end of the lower support portion 1701 in an upward direction.

The upper neck portion 1703 may have a cross-sectional area (diameter) that increases from an upper end of the lower neck portion 1702 in an upward direction. The upper support portion 1704 may extend in a cylindrical shape having a uniform diameter from an upper portion of the upper neck portion 1703.

In the support portion 170, a cross-section of a portion connecting the lower neck portion 1702 and the upper neck portion 1703 may be smallest in the length direction, and thus, the support portion 170 may be bent in a front-rear direction or in the left-right direction of the inner body 160. The support portion 170 may further include at least one circular protrusion portion (or circular rib) 1705. The circular protrusion portion 1705 may be formed in at least one of the lower neck portion 1702 and the upper neck portion 1703.

The circular protrusion portion 1705 may protrude in a radial direction and may extend in a circumferential direction. The plurality of circular protrusion portions 1705 may be spaced apart from the upper end of the lower neck 1702 and the lower end of the upper neck portion 1703, respectively, in an up-down direction to enhance support rigidity of the support portion 170.

In order to facilitate assembly of the outer cover 100 and the support portion 170, a prop portion (or prop tab) 172 and a protrusion portion (or protrusion tab) 173 may be provided at an upper end portion of the support portion 170. An extending portion (or extension) 175 may extend further upwards from an upper end portion the support portion 170. A fastening hole may be formed in the extending portion 175. The extending portion 175 may be integrally formed with the support portion 170 with the same rubber material or may be formed of a metal material different from that of the support portion 170.

The extending portion 175 may be formed of a different material from that of the support portion 170. In this case, a coupling protrusion 1751 may protrude from a lower end of the extending portion 175 and a coupling recess may be formed at an upper end of the upper support portion 1704, and as the coupling protrusion 1751 and the coupling recess are coupled, the support portion 170 and the extending portion 175 may be coupled.

A plate portion (or plate) 176 may extend in a horizontal direction from a lower end portion of the extending portion 175. The plate portion 176 may have an area extended in the horizontal direction to allow the coupling protrusion 1751 to be easily press-fit to the coupling recess when the extending portion 175 and the support portion 170 are assembled.

For example, after the coupling protrusion 1751 is brought into contact with an upper portion of the coupling recess, a downward pressing force may be applied to an upper surface of the plate portion 176, so that the extending portion 175 and the support portion 170 may be easily assembled.

The prop portion 172 may have a plate shape to stably support the front, back, right, and left four points of the outer cover 100. A plurality of fastening holes 1721 and 1722 may be formed in a penetrating manner in the prop portion 172. For example, the plurality of fastening holes 1721 and 1722 may include three fastening holes. The plurality of fastening holes 1721 and 1722 may include one first fastening hole 1721 and two second fastening holes 1722.

The protrusion portion 173 may protrude upwardly between the first fastening hole 1721 and the second fastening hole 1722 of the prop portion 172. The first fastening hole 1721 may be provided on a first side of the prop portion 172 in the length direction of the prop portion 172 and the second fastening hole 1722 may be provided on a second side of the prop portion 172 in the length direction.

One first fastening hole 1721 may be configured to fasten a first side of the prop portion 172 and the extending portion 175 of the support portion 170. A female screw thread may be formed in the extending portion 175 and a screw may be fastened to the female screw thread through the first fastening hole 1721 so that the prop portion 172 and the support portion 170 may be fastened.

The two second fastening holes 1722 among the plurality of fastening holes 1721 and 1722 may be configured to fasten a second side of the prop portion 172 and a front end portion of the handle 120. A first fitting coupling portion or boss 124 may be formed in a substantially rectangular box shape at the front end portion of the handle 120, particularly, at the front end portion of the lower part 123. The first fitting coupling portion 124 may be increased in size from an upper end to a lower end thereof.

For example, the front end of the lower part 123 may surround at least a portion of the outer cover 100 in order to couple with the outer cover 100. To this end, the front end portion of the lower part 123 may include a lower surface portion 1251 that surrounds the outer cover 100, a side surface portion 1252 that extends upwards from an inner end of the lower surface portion 1251, and a rear surface portion 1253 that intersects the lower surface portion 1251 and the side surface portion 1252 and may be upwardly sloped from a rear end of the lower surface portion 1251 backwards.

The first fitting coupling portion 124 may be formed in a box shape at a corner where the lower surface portion 1251, the side surface portion 1252, and the rear surface portion 1253 meet each other. A front surface and a side surface of the first fitting coupling portion 124 may be sloped such that a width thereof is increased downwards. According to this configuration, when the first fitting coupling portion 124 is coupled to an upper portion of a second fitting coupling portion or boss 110 of the outer cover 100 (to be described later) in an overlapping manner, the first fitting portion 124 may be easily stacked and coupled.

In the outer cover 100, the second fitting coupling portions 110 having a substantially square box shape may be formed on both sides of the front portion of the outer cover 100 to correspond to the first fitting coupling portions 124, and as the second fitting coupling portions 110 overlap the first insertion coupling portions 124 of the handle 120 in an up-down direction, the outer cover 100 and the handle 120 may be coupled with each other. The first fitting coupling portions 124 and the second fitting coupling portions 110 may be provided on at least two surfaces, which are the front side surface and an outer side surface, in an overlapping manner so as to be coupled.

An opening 111 may be formed on an upper surface of the second fitting coupling portion 110. The opening 111 may be penetrated by a portion of the prop portion 172. For example, the opening 111 may have a quadrangular shape and may be configured to expose the second side of the prop portion 172 including the protrusion portion 173 and the second fastening hole 1722 to the outside of the outer cover 100.

An upper surface of the second fitting coupling portion 110 of the outer cover 100 may surround the second side of the prop portion 172 including the protrusion portion 173 and the second fastening hole 1722 and may restrict movement of the prop portion 172 in front-back and left-right directions with respect to the outer cover 100. The protrusion portion 173 may be inserted through the opening 111 and may protrude upwards from the outer cover 100 so that an operator may easily recognize an assembling position of the outer cover 100 to which the front end portion of the handle 120 is to be assembled. The plurality of second fastening holes 1722 may be exposed upwards through the opening 111 of the outer cover 100.

Two coupling holes 1241 may be formed in a penetrating manner at an upper surface of the first fitting coupling portion 124 so as to correspond to the second fastening holes 1722 of the prop portion 172. An opening hole may be formed to allow the protrusion 173 to protrude from the upper surface of the first fitting coupling portion 124 therethrough. The protrusion 173 protruding through an opened portion of the first fitting coupling portion 124 and the opening hole of the second fitting coupling portion 110 may be covered by the middle part 122.

A plurality of fastening members 183 and 1532 such as a screw may penetrate through the first fitting coupling portion 124 and the prop portion 172 via the coupling hole 1241 and the second fastening hole 1722 to fasten the handle 120 and the prop portion 172. The prop portion 172 may further include a fitting protrusion or rib 174. The fitting protrusion 174 may protrude upwards between the first fastening hole 1721 and the protrusion portion 173.

The second fitting coupling portion 110 may further include a protrusion coupling portion or lip 112. The protrusion coupling portion 112 may protrude upwards so as to cover the fitting protrusion 174 at an upper end portion of the second fitting coupling portion 110.

The protrusion coupling portion 112 may have a box shape. The side surface portion 1252 of the protrusion coupling portion 112 may be in contact with an upper surface of the prop portion 172 and may be fitted between the fitting protrusion 174 and the protrusion portion 173. A front surface portion, a rear surface portion, and an upper surface portion of the protrusion coupling portion 112 may be coupled to be in contact with a front surface, a rear surface, and an upper surface of the fitting protrusion 174, respectively. The fitting protrusion 174 may be accommodated and fitted inside the protrusion coupling portion 112.

According to such a configuration, the protrusion coupling portion 112 of the outer cover 100 and the fitting protrusion 174 of the prop portion 172 may be fitted to each other, and accordingly, an upper portion of the support portion 170 and the outer cover 100 may be fastened to each other. Therefore, the handle 120 and the outer cover 100 including the box-shaped first fitting coupling portion 124 and the second fitting coupling portion 110, respectively, and the first and second fitting coupling portions 124 and 110 may be provided in an overlapping manner in an up-down direction so as to be stacked and coupled to each other.

The outer cover 100 and the handle 120 may share the prop portion 172 installed at an upper portion of the support portion 170 and may be respectively coupled to a first side and a second side of the prop portion 172, and here, the outer cover 100, which includes the protrusion coupling portion 112, may be coupled to a first side of the prop portion 172 such that the outer cover 100 covers the fitting protrusion 174 that protrudes from the first side of the prop portion 172.

The handle 120 may have a plurality of coupling holes 1241 formed on the upper surface of the first fitting coupling portion 124, and the plurality of second fastening holes 1722 may be formed on the second side of the prop portion 172. A plurality of fastening members may fasten an upper surface portion of the first fitting coupling portion 124 and the second side of the prop portion 172 provided in an overlapping manner in an up-down direction through the plurality of coupling holes 1241 and the second fastening holes 1722.

In order to assemble the handle 120 to an upper portion of the outer cover 100, an opening 111 may be formed on an upper surface of the second fitting coupling portion 110 of the outer cover 100 and the protruding portion 173 protruding from the prop portion 172 in the vertical upward direction may protrude through the opening 111, and thus, the operator may easily find an assembling position of the handle 120 and convenience of assembling may be improved.

Referring to FIGS. 11-14, in each of the plurality of rear support portions 170b, a lower support portion 1701 may be fixedly supported at an upper portion of the inner body 160. A support portion holder 180 may be provided at an upper portion of the inner body 160. The support portion holder 180 may be configured to surround and fix the lower support portion 1701 of the rear support portion 170b. The support portion holder 180 may be integrally formed of the same material as that of the inner body 160. The inner body 160 may be formed of a plastic material.

The support portion holder 180 may have a depressed structure. The support portion holder 180 may be opened upwards so that a lower neck portion 1702, an upper neck portion 1703 and an upper support portion 1704 of the rear support portion 170b may protrude upwards. The opening 111 may be formed on one side of the support portion holder 180 and may be open in a lateral direction.

A fixing portion accommodation recess may be formed on an inner side of the lower support portion 1701 and the fixing portion may be insertedly coupled to the fixing portion accommodation recess. A fixing protrusion may protrude from each of an upper end portion and a lower end portion of the fixing portion in a radial direction and the fixing portion may be press-fit to the fixing portion accommodation recess of the lower support portion 1701.

The fixing portion may be formed of a metal material. A female screw portion may be formed inside the fixing portion, and a fixing hole may be formed in a penetrating manner on a lower surface of the support portion holder 180. A fastening member such as a screw may be fastened to the female screw portion of the fixing portion through the fixing hole of the support portion holder 180 to fasten an upper portion of the inner body 160 and the rear support portion 170b.

In the rear support portion 170b, the upper support portion 1704 may be deformed to be movable in a front-rear direction and in a left-right direction with respect to the lower support portion 1701 due to structural characteristics of the upper neck portion 1703 and the lower neck portion 1702 which may be thin and may have characteristics of an elastic material such as rubber, or the like. A fastening portion or sink 181 may protrude from both sides of the rear portion of the lower part 123 of the handle 120. The fastening portion 181 may have a quadrangular shape.

A through hole 182 may be formed at both upper portions of the rear side of the outer cover 100 in a penetrating manner. The through hole 182 may have a quadrangular shape to correspond to the fastening portion 181. As the fastening portion 181 is inserted into the through hole 182, the outer cover 100 and the handle 120 may be coupled.

According to the fastening structure in which the handle 120 is stacked and arranged on the upper portion of the outer cover 100 and the fastening portion 181 of the handle 120 is insertedly coupled to the through hole 182 of the outer cover 100, the outer cover 100 and the handle 120 may be coupled on both left and right sides so that they cannot move in a front-rear direction and in the left-right direction. An upper end portion of the rear support portion 170b may be fastened to the fastening portion 181 of the handle 120 by a fastening member 183 such as a bolt, or the like.

In order to manually move the robot, the user may grip the rear portion of the handle 120 by hand to lift the robot 120. Rear portions of the handle 120 and the outer cover 100 may be lifted upwards by the user's hand, and front portions of the handle 200 and the outer cover 100 may be vertically suspended downwards. When the user lifts the handle 120, a tensile force may act on the rear portions of the handle 120 and the outer cover 100 in the upward direction and gravity may act on the inner body 160 in the downward direction due to its self-load.

A plurality of movement range restricting portions 190 may be provided to prevent the rear support portion 170b from being elongated in an upward direction or the rear support portion 170b from being damaged when the user's tensile force is transmitted to an upper portion of the rear support portion 170b through the handle 120.

The movement range restricting portions 190 may restrict a movement range of the plurality of support portions 170, respectively. For example, the movement range restricting portions 190 may restrict upward movement of the support portion 170. The movement range restricting portions 190 may guide the support portion 170 to slide backwards.

Each of the plurality of movement range restricting portions 190 may include an engaging portion or tab 191 and a movement restricting cover 193. The engaging portion 191 may have a plate shape. The engaging portion 191 may be arranged on the upper portion of the rear support portion 170*b*. The engaging portion 191 may be formed of the same material as that of the rear support portion 170*b* and integrally formed on the upper portion of the rear support portion 170*b* or may be formed of a different material from that of the rear support portion 170*b* and coupled with the rear support portion 170*b*.

A fixing portion or lip 1911 may protrude from a lower surface of the engaging portion 191 downwards and may be fastened to an upper end portion of the rear support portion 170*b*. The engaging portion 191 and the fixing portion 1911 may be formed of a metal material.

A coupling protrusion may protrude from an upper end portion and a lower end portion of the fixing portion 1911 in a radial direction, a coupling recess may be formed at an upper end portion of the rear support portion 170*b*, and the coupling protrusion may be coupled to the coupling recess in a shrink-fit manner. The rear support portion 170*b* may extend in a vertical direction, and the engaging portion 191 may extend in a horizontal direction. The engaging portion 191 may be formed to have a larger area than that of the rear support portion 170*b*.

A coupling portion or pillar 192 may further extend in an upward direction perpendicular to an upper surface of the engaging portion 191 and may be fastened to the fastening portion 181 of the handle 120. The coupling portion 192 may be provided on the same axis as that of the rear support portion 170*b*. The coupling portion 192 may have a quadrangular shape. A fastening hole may be formed in the coupling portion 192 and a fastening member 183 such as a bolt, or the like, may be coupled to the coupling portion 192 through the fastening portion 181 of the handle 120.

The movement restricting cover 193 may be mounted on both upper sides of the rear portion of the inner body 160 to cover the upper portion of the engaging portion 191. The movement restricting cover 193 may have a box structure having a rectangular shape. The movement restricting cover 193 may have a structure confining the engaging portion 191 and the rear support portion 170*b* therein.

However, the coupling portion 192 protruding from the upper portion of the engaging portion 191 may be configured to protrude from an upper portion of the movement restricting cover 193. A guide hole 1931 may be formed on the upper surface of the movement restricting cover 193, and the coupling portion 192 may protrude through the guide hole 1931. The guide hole 1931 may have a rectangular shape in which a width is narrow and a length is long.

The width of the guide hole 1931 may be equal to or slightly greater than the width of the coupling portion 192. The coupling portion 192 may slide along the guide hole 1931 in a front-rear direction and in the left-right direction only within the movement restricting cover 193.

An upper surface portion of the movement restricting cover 193 may surround both sides of the lower end portion of the coupling portion 192 and may cover the engaging portion 191 so that the engaging portion 191 may be caught by the upper surface of the movement restricting cover 193, thus restricting upward movement of the engaging portion 191 in a length direction of the rear support portion 170*b*. According to such a configuration, since the movement restricting cover 193 may restrict the engaging portion 191 from being lifted, a tensile load tensioning the upper end portion of the rear support portion 170*b* may be canceled out by a tensile force acting on the handle 120 when the robot is transported.

A plurality of ribs 1932 may protrude from an inner surface of the upper surface portion of the movement restricting cover 193 to an inner space of the movement restricting cover 193. The plurality of ribs 1932 may be spaced apart from each other in a length direction of the movement restricting cover 193. The plurality of ribs 1932 may be provided on both sides of the guide hole 1931 in a width direction of the upper surface portion.

The plurality of ribs 1932 spaced apart from each other may be in contact with the upper surface of the engaging portion 191. According to such a configuration, when the robot is transported, the engaging portion 191 may be in contact with the plurality of ribs 1932 formed on an inner side surface of an upper surface portion of the movement restricting cover 193 and the coupling portion 192 may move backwards along the guide recess 1931 to disperse a tensile force transmitted to an upper end portion of the rear support portion 170*b* through the fastening portion 181 and the coupling portion 192 of the handle 120.

A flange portion (or flange) 194 may extend from a front end portion and a rear end portion of the movement restricting cover 193 in a horizontal direction with respect to the length direction of the inner body 160. A plurality of reinforcing ribs 195 may protrude between the flange portion 194 positioned and a front end portion of the movement restricting cover 193 which are at a right angle and between another flange portion opposing the flange portion 194 and a rear end portion of the movement restricting cover 193.

In the flange portion 194 formed at the front end of the movement restricting cover 193, one fastening hole 1941 may be formed in a penetrating manner in an up-down direction between the plurality of reinforcing ribs 195, and in the flange portion 194 formed at the rear end of the movement restricting cover 193, a plurality of fastening holes 1941 may be spaced apart from the plurality of reinforcing ribs 195 in an outward lateral direction in a penetrating manner. A plurality of cover mounting portions or bosses 196 for mounting the movement restricting cover 193 may be formed on an upper portion of the inner body 160 and may be spaced apart from each other on the front and rear of the inner body 160 in a length direction with the support portion holder 180 interposed therebetween.

The cover mounting portion 196 positioned at the front of the support portion holder 180 may include one fastening recess for fastening of a fastening member, and the cover mounting portion 196 positioned at the rear of the support portion holder 180 may include two fastening recesses for fastening a fastening member. Fastening members such as bolts, or the like, may be respectively fastened to the fastening recesses of the cover mounting portion 196 through the fastening holes 1941 formed at the flange portions 194 of the front end portion and the rear end portion of the movement restricting cover 193, thus fastening the movement restricting cover 193 and the inner body 160.

The plurality of movement restricting covers 193 may be mounted on the upper portion of the inner body 160, the engaging portions 191 may be respectively formed on the plurality of support portions 170, the coupling portion 192 may protrude upwards from the upper surface of the engaging portion 191 so as to be coupled with the handle 120, and the engaging portion 191 may confine the engaging portion 191 inside the movement restricting cover 193 so as to be movable in a front-rear direction and in a left-right direction only inside the movement restricting cover 193, whereby the upper end portion of the plurality of rear support portions 170*b* may be moved in the front-rear and left-right directions with respect to the inner body 160 but may be prevented from being moved upwards with respect to the inner body 160.

Also, the movement restricting cover 193 may prevent upward movement of the plurality of rear support portions 170b relative to the inner body 160, whereby an external impact when the robot moves or a tensile force acting on an upper end of the rear support portion 170b when the robot is transported may be canceled out, preventing the rear support portion 170b from being elongated upwards along a length direction. Further, since the rear support portion 170b may be movably supported only inside the movement restricting cover 193, durability of the rear support portion 170b may be improved.

Further, since the plurality of ribs 1932 are spaced apart from each other on the inner surface of the upper surface portion of the movement restricting cover 193 so as to be able to contact the engaging portion 191 to distribute a tensile force for tensioning the upper end portion of the rear support portion 170b upwards to the plurality of ribs 1932, the movement restricting cover 193 may withstand a high tensile load transmitted from the engaging portion 191 to the upper surface portion of the movement restricting cover 193.

In addition, when the user grips and lifts the handle 120 to transport the robot, the coupling portion 192 and the engaging portion 191 may be moved backwards along the guide hole 1931 and the upper end portion of the rear support portion 170b may be bent in a direction opposite to gravity with respect to the inner body 160 due to a tensile load transmitted through the handle 120, and thus, a tensile force transmitted from the handle 120 to the rear support portion 170b may be attenuated.

An aspect of the present disclosure may provide a lawn mower robot in which a protrusion protruding through an opening formed at an upper portion of an outer cover is provided at an upper portion of a support portion, so that assembling positions of the outer cover and the support portion are easily recognized. Another aspect of the present disclosure may provide a lawn mower robot in which a plate-type prop portion propping an outer cover is provided at an upper portion of a support portion and a fastening hole is formed in the prop portion so as to be exposed to an upper portion of the outer cover through an opening to fasten a handle and the prop portion, whereby the handle and the support portion may be easily assembled.

Another aspect of the present disclosure may provide a lawn mower robot in which a fitting protrusion is formed at a prop portion, a protrusion coupling portion is formed at an outer cover, and the fitting protrusion and the protrusion coupling portion are coupled, thus easily assembling the outer cover and a support portion.

A lawn mower robot may include an inner body including a plurality of wheels for traveling on both sides; an outer cover mounted at an upper portion of the inner body and surrounding an outer side of the inner body; a handle mounted at an upper portion of the outer cover; a plurality of support portions disposed to be spaced apart from each other at an upper portion of the inner body in a front-rear direction and in a left-right direction and elastically supporting the outer cover in the front-rear direction and in the left-right direction with respect to the inner body; a prop portion mounted at an upper portion of each of the plurality of support portions and fastening the outer cover and the support portion; and a protrusion portion extending upwards from an upper surface of the prop portion and protruding by penetrating through the outer cover. The prop portion may have a plate-like shape.

The prop portion may include: a first fastening hole formed on one side of the prop portion to fasten an upper end portion of the support portion and the prop portion and spaced apart from the protrusion portion in one direction; and a plurality of second fastening holes formed on the other side of the prop portion to fasten a front end portion of the handle and the prop portion and spaced apart from the protrusion portion in another direction. The prop portion may further include a fitting protrusion extending to protrude upwards between the first fastening hole and the protrusion portion and fitted and coupled to the inner side of the outer cover, wherein the outer cover may further include a plurality of protrusion coupling portions formed to cover the fitting protrusion.

The handle may further include a first fitting coupling portion protruding from an inner side of the front end portion and having a box shape, wherein the outer cover may further include a second fitting coupling portion protruding from both sides of the front, having a box shape, and coupled with the first fitting coupling portion in an overlapping manner in an up-down direction. The second fitting coupling portion may have an opening formed on an upper surface thereof and the protrusion portion may protrude upwards from the outer cover therethrough.

The handle may include: a lower part having a first fitting coupling portion on an inner side of the front end portion and stacked on and coupled to an upper portion of the outer cover; a middle part stacked on and coupled to cover an upper portion of the lower part; and an upper part stacked on and coupled to cover an upper portion of the middle part. An upper surface portion of the first fitting coupling portion may be arranged in an overlapping manner at an upper portion of the other side of the prop portion exposed upwards through the opening and fastened to the prop portion.

The protrusion portion protruding through the opening may protrude through the lower part and may be covered by the middle part. The upper part may have a plurality of coupling hooks spaced apart from each other in a length direction on an inner side, the middle part may have a plurality of hook coupling holes formed to correspond to the plurality of coupling hooks on an inner side, and the upper part and the middle part may be stacked on and coupled to each other, the middle part may have a plurality of fastening protrusions that protrude from a lower surface thereof, the lower part may have a plurality of boss portions that protrude from an upper surface thereof and a plurality of protrusion accommodation recesses respectively formed inside the plurality of boss portions and accommodating the plurality of fastening protrusions, and the middle part and the lower part may be stacked on and coupled to each other, and a plurality of arrest hooks may protrude from an inner surface of a front end portion of each of the upper part, the middle part, and the lower part to couple the upper part, the middle part, and lower part in a stacking manner to both sides of the front of the outer cover.

The lawn mower robot may further include a corrugated portion corrugated in a radial direction on an outer circumferential surface of a lower end portion of each of the plurality of support portions and movably supporting the support portion in a front-rear direction and in a left-right direction. The lawn mower robot may further include an extending portion in which a lower end portion is coupled to an upper portion of each of the plurality of support portions and an upper end portion is fastened to the prop portion; and a plate portion extending from a lower end portion of the extending portion in a horizontal direction.

A lawn mower robot may include an inner body including a plurality of wheels for traveling on both sides; an outer cover mounted at an upper portion of the inner body and surrounding an outer side of the inner body; a driving motor mounted on each of the plurality of wheels to drive the wheels; a plurality of blades rotatably provided on a lower surface of the inner body to mow lawns; a handle mounted at an upper portion of the outer cover; a plurality of support portions disposed to be spaced apart from each other at an upper portion of the inner body in a front-rear direction and in a left-right direction and elastically supporting the outer cover in the front-rear direction and in the left-right direction with respect to the inner body; a prop portion mounted at an upper portion of each of the plurality of support portions and fastening the outer cover and the support portion; and a protrusion portion extending upwards from an upper surface of the prop portion and protruding by penetrating through the outer cover.

A lawn mower robot may include an inner body including a plurality of wheels for traveling on both sides; an outer cover mounted at an upper portion of the inner body and surrounding an outer side of the inner body; a handle mounted at an upper portion of the outer cover; a joystick bumper mounted to be rotatable in a front-rear direction at a central portion of the front of the inner body; a collision sensor sensing whether the outer cover collides with an obstacle; a plurality of support portions spaced apart from each other at an upper portion of the inner body in a front-rear direction and in a left-right direction and elastically supporting the outer cover in the front-rear direction and in the left-right direction with respect to the inner body; a prop portion mounted at an upper portion of each of the plurality of support portions and fastening the outer cover and the support portion; and a protrusion portion extending upwards from an upper surface of the prop portion and protruding by penetrating through the outer cover. The collision sensor may include a permanent magnet mounted at a lower end portion of the joystick bumper; and a hall sensor installed at the inner body and sensing a rotational movement of the permanent magnet when the outer cover collides.

The advantages of the lawn mower robot will be described as follows. First, since the prop portion is provided at an upper portion of the support portion and a fitting protrusion formed on one side of the prop portion is coupled with a protrusion coupling portion formed at an upper portion of the outer cover, the outer cover may be movably elastically supported in a front-rear direction and in a left-right direction with respect to the inner body.

Second, since the box-shaped first fitting coupling portion is provided inside a front end portion of the handle and the box-shaped second fitting coupling portion is provided on both sides of the front of the outer cover, the handle and the outer cover may be coupled in a stacking manner such that the first fitting coupling portions are folded in an up-down direction. Third, since the protrusion extending upwards from the prop portion at an upper portion of the support portion protrudes through the opening formed at the upper portion of the outer cover, an operator may easily recognize an assembling position of the outer cover when assembling the outer cover to the prop portion through the protrusion, enhancing convenience of assembling.

Fourth, since the protrusion coupling portion formed at an upper portion of the outer cover is coupled to enclose the fitting protrusion of the prop portion and an upper surface of the first fitting coupling portion of the handle and the other side of the prop portion are disposed in an overlapping manner to fasten the handle and the prop portion, the outer cover and the handle may be easily assembled together with the prop portion.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A moving robot comprising:
    an inner body including a plurality of wheels;
    an outer cover mounted on the inner body and surrounding the inner body;
    a handle mounted at the outer cover;
    a plurality of support pillars provided at the inner body and spaced apart from each other in a first horizontal direction and in a second horizontal direction and elastically supporting the outer cover in the first horizontal direction and in the second horizontal direction with respect to the inner body;
    a prop tab mounted at each of the plurality of support pillars and configured to fasten the outer cover to a respective support pillar; and
    a protrusion tab that extends upwards from an upper surface of the prop tab and penetrates through the outer cover,
    wherein the prop tab includes:
    a first fastening hole that is formed on a first side of the prop tab to fasten an upper end of the support pillar to the prop tab and is spaced apart from the protrusion tab in the second horizontal direction; and
    a plurality of second fastening holes that are formed on a second side of the prop tab to fasten a front end of the handle to the prop tab and are spaced apart from the protrusion tab in the second horizontal direction.

2. The moving robot of claim 1, wherein the prop tab has a plate-like shape.

3. The moving robot of claim 1, wherein the prop tab further includes a fitting rib that protrudes upwards between the first fastening hole and the protrusion tab and is fitted and coupled to an inner side of the outer cover, and wherein the outer cover further includes a protrusion coupling lip that covers the fitting rib.

4. The moving robot of claim 1, wherein the handle further includes a first fitting coupling boss that protrudes from an inner side of the front end of the handle, the first fitting coupling boss having a box shape, and wherein the outer cover further includes a second fitting coupling boss that protrudes laterally from the outer cover to correspond to the first fitting coupling boss and coupled with the first fitting coupling boss in an overlapping manner.

5. The moving robot of claim 4, wherein the second fitting coupling boss has an opening formed on an upper surface thereof and the protrusion tab protrudes upwards from the outer cover through the opening.

6. The moving robot of claim 5, wherein the handle includes:
    a lower section having the first fitting coupling boss on an inner side of the front end and coupled to the outer cover;
    a middle section coupled to cover the lower section; and
    an upper section coupled to cover the middle section.

7. The moving robot of claim 6, wherein an upper surface of the first fitting coupling boss overlaps the second side of the prop tab that is exposed through the opening and is fastened to the second side of the prop tab.

8. The moving robot of claim 6, wherein the protrusion tab that protrudes through the opening protrudes through the lower section of the handle and is covered by the middle section.

9. The moving robot of claim 6, wherein
    the upper section of the handle includes a plurality of coupling hooks spaced apart from each other in the first horizontal direction on an inner side of the upper section of the handle,
    the middle section of the handle includes a plurality of hook coupling holes that correspond to the plurality of coupling hooks on an outer side of the middle section of the handle,
    the upper section and the middle section are stacked on and coupled to each other,
    the middle section of the handle includes a plurality of fastening protrusions that protrude from a lower surface of the middle section,
    the lower section of the handle includes a plurality of bosses that protrude from an upper surface of the lower section and a plurality of protrusion accommodation recesses respectively formed inside the plurality of bosses and configured to accommodate the plurality of fastening protrusions,
    the middle section and the lower section are stacked on and coupled to each other, and
    a plurality of arrest hooks protrude from an inner surface of a front end of each of the upper section, the middle section, and the lower section to couple the upper section, the middle section, and lower section in a stacking manner to both sides of the front of the outer cover.

10. The moving robot of claim 1, further comprising:
    a corrugated skirt corrugated in a radial direction on an outer circumferential surface of a lower end of each of the plurality of support pillars and movably supporting each of the support pillars in the first and second horizontal directions.

11. The moving robot of claim 1, further comprising:
    a plurality of extensions, each extension having a lower end coupled to an upper end of each of the plurality of support pillars, respectively, and an upper end fastened to the prop tab; and
    a plate that extends from the lower end of each of the extensions in the first horizontal direction.

12. A lawn mower robot comprising:
    an inner body including a plurality of wheels;
    an outer cover mounted on and surrounding a top of the inner body;
    a driving motor mounted on each of the plurality of wheels to drive the wheels;
    a plurality of blades rotatably provided on a lower surface of the inner body;
    a handle mounted at the outer cover;
    a plurality of support pillars spaced apart from each other on the inner body in a first horizontal direction and a second horizontal direction and configured to elastically support the outer cover in the first and second horizontal directions with respect to the inner body;

a prop tab mounted to each of the plurality of support pillars and configured to fasten the outer cover to each of the support pillars; and a protrusion tab that extends upwards from an upper surface of the prop tab and penetrates through the outer cover, wherein the prop tab includes:
 a first fastening hole that is formed on a first side of the prop tab to fasten an upper end of the support pillar to the prop tab and is spaced apart from the protrusion tab in the second horizontal direction; and
 a plurality of second fastening holes that are formed on a second side of the prop tab to fasten a front end of the handle to the prop tab and are spaced apart from the protrusion tab in the second horizontal direction.

13. A moving robot comprising:
an inner body including a plurality of wheels;
an outer cover mounted on and surrounding a top of the inner body;
a handle mounted to the outer cover;
a joystick bumper mounted on the inner body and configured to be rotatable about a horizontal axis;
a collision sensor configured to sense whether the outer cover collides with an obstacle;
a plurality of support pillars provided at the inner body and spaced apart from each other, the plurality of support pillars elastically supporting the outer cover with respect to the inner body;
a prop tab mounted at each of the plurality of support pillars and configured to fasten the outer cover to each of the support pillars; and
a protrusion tab that extends upwards from an upper surface of the prop tab and penetrates through the outer cover, wherein the prop tab includes:
 a first fastening hole that is formed on a first side of the prop tab to fasten an upper end of the support pillar to the prop tab and is spaced apart from the protrusion tab in the second horizontal direction; and
 a plurality of second fastening holes that are formed on a second side of the prop tab to fasten a front end of the handle to the prop tab and are spaced apart from the protrusion tab in the second horizontal direction.

14. The moving robot of claim 13, wherein the collision sensor includes:
 a permanent magnet mounted at a lower end of the joystick bumper; and
 a hall sensor installed at the inner body and configured to sense a movement of the permanent magnet when the outer cover collides with the obstacle.

15. The moving robot of clam 14, further comprising a spring attached to the joystick bumper and the inner body and configured to return the joystick bumper to an original position after the collision sensor senses a collision.

16. The moving robot of claim 13, wherein the handle includes a first fitting coupling boss and the outer cover includes a second fitting coupling boss, and wherein a shape of the first fitting coupling boss corresponds to a shape of the second fitting coupling boss.

17. The moving robot of claim 13, wherein the prop tab further includes a fitting rib that protrudes upwards between the first fastening hole and the protrusion tab and is fitted and coupled to an inner side of the outer cover, and wherein the outer cover further includes a protrusion coupling lip that covers the fitting rib.

18. The moving robot of claim 13, further comprising:
 a corrugated skirt corrugated in a radial direction on an outer circumferential surface of a lower end of each of the plurality of support pillars and movably supporting each of the support pillars in the first and second horizontal directions.

19. The moving robot of claim 12, wherein the prop tab further includes a fitting rib that protrudes upwards between the first fastening hole and the protrusion tab and is fitted and coupled to an inner side of the outer cover, and wherein the outer cover further includes a protrusion coupling lip that covers the fitting rib.

20. The moving robot of claim 12, wherein one of the support pillars includes:
 a lower support portion contacting the inner body;
 a lower neck portion extending above the lower support portion;
 an upper neck portion extending above the lower neck portion; and
 an upper support portion extending above the lower support portion.

* * * * *